(12) United States Patent
Xu et al.

(10) Patent No.: US 11,706,422 B2
(45) Date of Patent: *Jul. 18, 2023

(54) METHOD AND APPARATUS FOR VIDEO CODING

(71) Applicant: TENCENT AMERICA LLC, Palo Alto, CA (US)

(72) Inventors: Xiaozhong Xu, State College, PA (US); Byeongdoo Choi, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,849

(22) Filed: Mar. 14, 2022

(65) Prior Publication Data

US 2022/0210440 A1 Jun. 30, 2022

Related U.S. Application Data

(63) Continuation of application No. 17/035,051, filed on Sep. 28, 2020, now Pat. No. 11,310,511.

(Continued)

(51) Int. Cl.
*H04N 19/159* (2014.01)
*H04N 19/119* (2014.01)
(Continued)

(52) U.S. Cl.
CPC ......... *H04N 19/159* (2014.11); *H04N 19/119* (2014.11); *H04N 19/172* (2014.11);
(Continued)

(58) Field of Classification Search
CPC ............................ H04N 19/70; H04N 19/159
See application file for complete search history.

(56) References Cited

U.S. PATENT DOCUMENTS 7,330,509 B2   2/2008   Lu et al.
7,983,496 B2   7/2011   Liu et al.
(Continued)

FOREIGN PATENT DOCUMENTS

WO   2019154936 A1   8/2019

OTHER PUBLICATIONS

Bross et al., "Versatile Video Coding (Draft 2)," JVET-K1001, 13th Meeting: Marrakech, MA. Jan. 9-18, 2019 (140 pages).

(Continued)

*Primary Examiner* — Jerry T Jean Baptiste
(74) *Attorney, Agent, or Firm* — Arentfox Schiff LLP

(57) ABSTRACT

Aspects of the disclosure provide a method and an apparatus including processing circuitry for video decoding. The processing circuitry receives, from a coded video bitstream, coding information for a current picture. At least one flag in the coding information indicates one or more allowable coding types for sub-partitions in the current picture. The one or more allowable coding types include at least one of intra coding and inter coding for the sub-partitions. The processing circuitry determines, based on the at least one flag, whether to decode intra syntax elements used only for coding intra sub-partitions and whether to decode inter syntax elements used only for coding inter sub-partitions. The processing circuitry decodes the intra syntax elements in the coding information when the intra syntax elements are determined to be decoded and decodes the inter syntax elements in the coding information when the inter syntax elements are determined to be decoded.

20 Claims, 21 Drawing Sheets

Related U.S. Application Data

(60) Provisional application No. 62/912,764, filed on Oct. 9, 2019.

(51) Int. Cl.
  *H04N 19/70* (2014.01)
  *H04N 19/174* (2014.01)
  *H04N 19/44* (2014.01)
  *H04N 19/172* (2014.01)

(52) U.S. Cl.
  CPC ........... *H04N 19/174* (2014.11); *H04N 19/44* (2014.11); *H04N 19/70* (2014.11)

(56) References Cited

U.S. PATENT DOCUMENTS

| | | |
|---|---|---|
| 8,065,852 B2 | 12/2011 | Liu et al. |
| 8,238,442 B2 | 8/2012 | Liu |
| 8,526,495 B2 | 9/2013 | Liu et al. |
| 9,049,452 B2 | 6/2015 | Liu et al. |
| 9,363,511 B2 | 6/2016 | Zhang et al. |
| 9,769,472 B2 | 9/2017 | Liu et al. |
| 10,136,144 B2 | 11/2018 | Liu et al. |
| 10,205,968 B2 | 2/2019 | Liu et al. |
| 10,397,569 B2 | 8/2019 | Liu et al. |
| 10,455,231 B2 | 10/2019 | Xu et al. |
| 10,511,834 B2 | 12/2019 | Xu et al. |
| 10,542,253 B2 | 1/2020 | Liu et al. |
| 10,567,752 B2 | 2/2020 | Zhao et al. |
| 10,575,013 B2 | 2/2020 | Liu et al. |
| 10,582,195 B2 | 3/2020 | Liu et al. |
| 10,587,881 B2 | 3/2020 | Xu et al. |
| 10,587,885 B2 | 3/2020 | Ye et al. |
| 10,595,019 B2 | 3/2020 | Chernyak et al. |
| 10,609,384 B2 | 3/2020 | Chen et al. |
| 10,609,402 B2 | 3/2020 | Zhao et al. |
| 10,609,403 B2 | 3/2020 | Xu et al. |
| 2013/0114668 A1 | 5/2013 | Misra et al. |
| 2014/0376626 A1 | 12/2014 | Lee |
| 2015/0163505 A1* | 6/2015 | Sato ............ H04N 19/187 375/240.12 |
| 2017/0054996 A1 | 2/2017 | Xu et al. |
| 2017/0094271 A1 | 3/2017 | Liu et al. |
| 2021/0136419 A1 | 5/2021 | Hsiang |
| 2021/0227208 A1* | 7/2021 | Lee ............ H04N 19/159 |

OTHER PUBLICATIONS

Bross et al., "General Video Coding Technology in Responses to the Joint Call for Proposals on Video Compression with Capability beyond HEVC," IEEE Transactions on Circuits and Systems for Video Technology, 2019 (16 pages).

Liu et al., "Deep Learning-Based Technology in Responses to the Joint Call for Proposals on Video Compression with Capability beyond HEVC," IEEE Transactions on Circuits and Systems for Video Technology. 2019 (14 pages).

Zhu et al., "Residual Convolution Neural Network Based In-Loop Filter With Intra and Inter Frames Processed Respectively for AVS3." 2020 IEEE International Conference on Multimedia & Expo Workshops (ICMEW), London, UK, Jul. 2020 (8 pages).

Liu et al., "Joint Temporal—Spatial Bit Allocation for Video Coding With Dependency," IEEE Transactions on Circuits and Systems for Video Technology, vol. 15, No. 1, pp. 15-26, Jan. 2015 (13 pages).

Joshi et al., "High Efficiency Video Coding (HEVC) Screen Content Coding, Draft 4," JCTVC-U1005, 21st Meeting: Warsaw, PL. Jun. 19-26, 2015 (661 pages).

Joshi et al., "Screen content coding test model 1 (SCM 1)," JCTV-Q1014, 17th Meeting: Valencia, ES. Mar. 27-Apr. 4, 2014 (5 pages).

Xu et al., "Block Vector Prediction in Intra Block Copy for HEVC Screen Content Coding," 2015 Data Compression Conference (10 pages).

Xu et al., "Intra block copy in Versatile Video Coding with Reference Sample Memory Reuse." 2019 Picture Coding Symposium (PCS) (5 pages).

Chen et al., "Screen Content Coding Using Non-Square Intra Block Copy for HEVC," 2014 IEEE International Conference on Multimedia and Expo (ICME), Chengdu, China, Jul. 2014 (6 pages).

Wang et al., "Intra Block Copy in AVS3 Video Coding Standard," 2020 IEEE International Conference on Multimedia & Expo Workshops (ICMEW), London, UK, Jul. 2020 (6 pages).

Liu et al., "Hybrid global—local motion compensated frame interpolation for low bit rate video coding," Journal of Visual Communication and Image Representation 14(1) (19 pages).

Liu et al., "Nonliner motion-compensated interpolation for low-bit-rate video," Applications of Digital Image Processing XXIII 4115 (12 pages).

Zhang et al., "Intra Mode Coding in HEVC Standard," 2012 Visual Communication and Image Processing (6 pages).

Liu et al., "Bit-depth Scalable Coding for High Dynamic Range Video," Visual Communications and Image Processing 2006, vol. 6822 (10 pages).

Li et al., "Methodology and reporting template for neural network coding tool testing," JVET-M1006, 13th Meeting: Marrakech, MA, Jan. 9-18, 2019 (4 pages).

Liu et al., "JVET AHG report 9: Neural Networks in Video Coding (AHG9)," JVET-J0009, 10th Meeting: San Diego, US, Apr. 10-20, 2018 (3 pages).

Xu et al., "Intra Block Copy in HEVC Screen Content Coding Extensions," IEEE Journal on Emerging and Selected Topics in Circuits and Systems, Jun. 22, 2016 (11 pages).

Liu et al., "Overview of HEVC extensions on screen content coding," SIP vol. 4, E10, 2015 (12 pages).

Bross et al., "Versalile Video Coding (Draft 6)," JVET-O2001vE. 15th Meeting: Gotherburg. SE, Jul. 3-12, 2019 (456 pages).

Examination Report in IN202137043766, dated May 17, 2022, 6 pages.

Japanese Office Action in 2021-555365, dated Oct. 4, 2022, with English Translation, 10 pages.

Karsten Suehring, Yago Sanchez, and Robert Skupin, AHG17: On slice_type (tile_group_type), Joint Video Experts Team (JVET) of ITU-T SG 16 WP3 and ISO/IEC JTC 1/SC 29/WG 11, JVET-M0386, 13th Meeting: Marrakech, M A, Jan. 2019, pp. 1-2.

\* cited by examiner

| picture_header_structure( ) { | Descriptor |
|---|---|
|   ph_gdr_or_irap_pic_flag | u(1) |
|   ph_non_ref_pic_flag | u(1) |
|   if( ph_gdr_or_irap_pic_flag ) | |
|     ph_gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ph_pic_parameter_set_id | ue(v) |
|   ph_pic_order_cnt_lsb | u(v) |
|   if( ph_gdr_pic_flag ) | |
|     ph_recovery_poc_cnt | ue(v) |
|   for( i = 0; i < NumExtraPhBits; i++ ) | |
|     ph_extra_bit[ i ] | u(1) |
|   if( sps_poc_msb_cycle_flag ) { | |
|     ph_poc_msb_cycle_present_flag | u(1) |
|     if( ph_poc_msb_cycle_present_flag ) | |
|       ph_poc_msb_cycle_val | u(v) |
|   } | |
|   if( sps_alf_enabled_flag && pps_alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( sps_chroma_format_idc != 0 ) { | |
|         ph_alf_cb_enabled_flag | u(1) |
|         ph_alf_cr_enabled_flag | u(1) |
|       } | |
|       if( ph_alf_cb_enabled_flag || ph_alf_cr_enabled_flag ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |

FIG. 13A

| | |
|---|---|
| } | |
| if( sps_lmcs_enabled_flag ) { | |
|    ph_lmcs_enabled_flag | u(1) |
|    if( ph_lmcs_enabled_flag ) { | |
|      ph_lmcs_aps_id | u(2) |
|      if( sps_chroma_format_idc != 0 ) | |
|         ph_chroma_residual_scale_flag | u(1) |
|    } | |
| } | |
| if( sps_explicit_scaling_list_enabled_flag ) { | |
|    ph_explicit_scaling_list_enabled_flag | u(1) |
|    if( ph_explicit_scaling_list_enabled_flag ) | |
|      ph_scaling_list_aps_id | u(3) |
| } | |
| if( sps_virtual_boundaries_enabled_flag && !sps_virtual_boundaries_present_flag ) { | |
|    ph_virtual_boundaries_present_flag | u(1) |
|    if( ph_virtual_boundaries_present_flag ) { | |
|      ph_num_ver_virtual_boundaries | ue(v) |
|      for( i = 0; i < ph_num_ver_virtual_boundaries; i++ ) | |
|         ph_virtual_boundary_pos_x_minus1[ i ] | ue(v) |
|      ph_num_hor_virtual_boundaries | ue(v) |
|      for( i = 0; i < ph_num_hor_virtual_boundaries; i++ ) | |
|         ph_virtual_boundary_pos_y_minus1[ i ] | ue(v) |
|    } | |
| } | |
| if( pps_output_flag_present_flag && !ph_non_ref_pic_flag ) | |
|    ph_pic_output_flag | u(1) |
| if( pps_rpl_info_in_ph_flag ) | |
|    ref_pic_lists( ) | |
| if( sps_partition_constraints_override_enabled_flag ) | |
|    ph_partition_constraints_override_flag | u(1) |
| if( ph_intra_slice_allowed_flag ) { | |
|    if( ph_partition_constraints_override_flag ) { | |
|      ph_log2_diff_min_qt_min_cb_intra_slice_luma | ue(v) |
|      ph_max_mtt_hierarchy_depth_intra_slice_luma | ue(v) |
|      if( ph_max_mtt_hierarchy_depth_intra_slice_luma != 0 ) { | |
|         ph_log2_diff_max_bt_min_qt_intra_slice_luma | ue(v) |
|         ph_log2_diff_max_tt_min_qt_intra_slice_luma | ue(v) |
|      } | |
|      if( sps_qtbtt_dual_tree_intra_flag ) { | |
|         ph_log2_diff_min_qt_min_cb_intra_slice_chroma | ue(v) |
|         ph_max_mtt_hierarchy_depth_intra_slice_chroma | ue(v) |
|         if( ph_max_mtt_hierarchy_depth_intra_slice_chroma != 0 ) { | |

| | |
|---|---|
| ph_log2_diff_max_bt_min_qt_intra_slice_chroma | ue(v) |
| ph_log2_diff_max_tt_min_qt_intra_slice_chroma | ue(v) |
|     } | |
|   } | |
| } | |
| if( pps_cu_qp_delta_enabled_flag ) | |
|   ph_cu_qp_delta_subdiv_intra_slice | ue(v) |
| if( pps_cu_chroma_qp_offset_list_enabled_flag ) | |
|   ph_cu_chroma_qp_offset_subdiv_intra_slice | ue(v) |
| } | |
| if( ph_inter_slice_allowed_flag ) { | |
|   if( ph_partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( pps_cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && pps_rpl_info_in_ph_flag ) { | |
|       if( num_ref_entries[ 1 ][ RplsIdx[ 1 ] ] > 0 ) | |
|         ph_collocated_from_l0_flag | u(1) |
|       if( ( ph_collocated_from_l0_flag && <br>          num_ref_entries[ 0 ][ RplsIdx[ 0 ] ] > 1 ) \|\| <br>       ( !ph_collocated_from_l0_flag && <br>          num_ref_entries[ 1 ][ RplsIdx[ 1 ] ] > 1 ) ) | |
|         ph_collocated_ref_idx | ue(v) |
|     } | |
|   } | |
|   if( sps_mmvd_fullpel_only_enabled_flag ) | |
|     ph_mmvd_fullpel_only_flag | u(1) |
|   presenceFlag = 0 | |
|   if( !pps_rpl_info_in_ph_flag ) /* This condition is intentionally not merged into the next, to avoid possible interpretation of RplsIdx[ 1 ] being unspecified. */ | |
|     presenceFlag = 1 | |
|   else if( num_ref_entries[ 1 ][ RplsIdx[ 1 ] ] > 0 ) | |
|     presenceFlag = 1 | |
|   if( presenceFlag ) { | |

FIG. 13C

| | |
|---|---|
|     ph_mvd_l1_zero_flag | u(1) |
|     if( sps_bdof_control_present_in_ph_flag ) | |
|         ph_bdof_disabled_flag | u(1) |
|     if( sps_dmvr_control_present_in_ph_flag ) | |
|         ph_dmvr_disabled_flag | u(1) |
|     } | |
|     if( sps_prof_control_present_in_ph_flag ) | |
|         ph_prof_disabled_flag | u(1) |
|     if( ( pps_weighted_pred_flag \|\| pps_weighted_bipred_flag ) && <br>        pps_wp_info_in_ph_flag ) | |
|         pred_weight_table( ) | |
|   } | |
|   if( pps_qp_delta_info_in_ph_flag ) | |
|     ph_qp_delta | se(v) |
|   if( sps_joint_cbcr_enabled_flag ) | |
|     ph_joint_cbcr_sign_flag | u(1) |
|   if( sps_sao_enabled_flag && pps_sao_info_in_ph_flag ) { | |
|     ph_sao_luma_enabled_flag | u(1) |
|     if( sps_chroma_format_idc != 0 ) | |
|         ph_sao_chroma_enabled_flag | u(1) |
|   } | |
|   if( pps_dbf_info_in_ph_flag ) { | |
|     ph_deblocking_params_present_flag | u(1) |
|     if( ph_deblocking_params_present_flag ) { | |
|         if( !pps_deblocking_filter_disabled_flag ) | |
|             ph_deblocking_filter_disabled_flag | u(1) |
|         if( !ph_deblocking_filter_disabled_flag ) { | |
|             ph_luma_beta_offset_div2 | se(v) |
|             ph_luma_tc_offset_div2 | se(v) |
|             if( pps_chroma_tool_offsets_present_flag ) { | |
|                 ph_cb_beta_offset_div2 | se(v) |
|                 ph_cb_tc_offset_div2 | se(v) |
|                 ph_cr_beta_offset_div2 | se(v) |
|                 ph_cr_tc_offset_div2 | se(v) |
|             } | |
|         } | |
|     } | |
|   } | |
|   if( pps_picture_header_extension_present_flag ) { | |
|     ph_extension_length | ue(v) |
|     for( i = 0; i < ph_extension_length; i++) | |
|         ph_extension_data_byte[ i ] | u(8) |
|   } | |

FIG. 13D

TABLE 1: SYNTAX TABLE RELATED TO AN INTRA ONLY FLAG

| | |
|---|---|
| pic_intra_only_flag | u(1) |
| if(!pic_intra_only_flag){ | |
| if( sps_temporal_mvp_enabled_flag && !pps_temporal_mvp_enabled_idc ) | |
| pic_temporal_mvp_enabled_flag | u(1) |
| if(!pps_mvd_l1_zero_idc ) | |
| mvd_l1_zero_flag | u(1) |
| if( pps_six_minus_max_num_merge_cand_plus1 ) | |
| pic_six_minus_max_num_merge_cand | ue(v) |
| if( sps_affine_enabled_flag && !pps_five_minus_max_num_subblock_merge_cand_plus1 ) | |
| pic_five_minus_max_num_subblock_merge_cand | ue(v) |
| if( sps_fpel_mmvd_enabled_flag ) | |
| pic_fpel_mmvd_enabled_flag | u(1) |
| if( sps_bdof_dmvr_slice_present_flag ) | |
| pic_disable_bdof_dmvr_flag | u(1) |
| if( sps_triangle_enabled_flag && MaxNumMergeCand >= 2 && !pps_max_num_merge_cand_minus_max_num_triangle_cand_minus1 ) | |
| pic_max_num_merge_cand_minus_max_num_triangle_cand | ue(v) |
| } | |

TABLE 2: SYNTAX TABLE RELATED TO AN INTER ONLY FLAG

| | |
|---|---|
| pic_inter_only_flag | u(1) |
| if( !pic_inter_only_flag ) | |
| if( qtbtt_dual_tree_intra_flag ) { | |
| pic_log2_diff_min_qt_min_cb_chroma | ue(v) |
| pic_max_mtt_hierarchy_depth_chroma | ue(v) |
| if( pic_max_mtt_hierarchy_depth_chroma != 0 ) { | |
| pic_log2_diff_max_bt_min_qt_chroma | ue(v) |
| pic_log2_diff_max_tt_min_qt_chroma | ue(v) |
| } | |
| } | |
| } | |

*FIG. 14B*

METHOD AND APPARATUS FOR VIDEO CODING

INCORPORATION BY REFERENCE

This present application is a continuation application of U.S. application Ser. No. 17/035,051, filed Sep. 28, 2020, which claims the benefit of priority to U.S. Provisional Application No. 62/912,764, entitled "High Level Syntax Control for Video Coding" and filed on Oct. 9, 2019. The contents of each of the above-identified applications are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can receive, from a coded video bitstream, coding information for a current picture. At least one flag in the coding information can indicate one or more allowable coding types for sub-partitions in the current picture. The one or more allowable coding types can include at least one of intra coding and inter coding for the sub-partitions. The processing circuitry can determine, based on the at least one flag, whether to decode intra syntax elements used only for coding intra sub-partitions and whether to decode inter syntax elements used only for coding inter sub-partitions. The processing circuitry can decode the intra syntax elements in the coding information based on the intra syntax elements being determined to be decoded. The processing circuitry can decode the inter syntax elements in the coding information based on the inter syntax elements being determined to be decoded.

In an embodiment, the at least one flag includes at least one of a first flag indicating whether an inter-coded sub-partition is allowed in the current picture and a second flag indicating whether an intra-coded sub-partition is allowed in the current picture.

In an example, the at least one flag includes only the first flag. The first flag can indicate that no inter-coded sub-partition is allowed in the current picture. The one or more coding types can be the intra coding for the sub-partitions.

The processing circuitry can determine that no inter syntax element is to be decoded for the current picture and determine that the intra syntax elements are to be decoded for the sub-partitions.

In an example, the at least one flag includes the first flag and the second flag. The first flag can indicate that the inter-coded sub-partition is allowed in the current picture. The second flag can indicate that no intra-coded sub-partition is allowed in the current picture. The processing circuitry can determine that the inter syntax elements are to be decoded for the sub-partitions with the inter coding. The processing circuitry can determine that no intra syntax element is to be decoded for the current picture.

In an example, the at least one flag includes the first flag and the second flag. The first flag can indicate that no inter-coded sub-partition is allowed in the current picture. The second flag can indicate that the intra-coded sub-partition is allowed in the current picture. The processing circuitry can determine that no inter syntax elements is to be decoded for the current picture and can determine that the intra syntax elements are to be decoded for the sub-partitions.

In an example, the at least one flag can include the first flag and the second flag. The first flag can indicate that the inter-coded sub-partition is allowed in the current picture. The second flag can indicate that the intra-coded sub-partition is allowed in the current picture. The processing circuitry can determine that the inter syntax elements are to be decoded for at least one of the sub-partitions with the inter coding. The processing circuitry can determine that the intra syntax elements are to be decoded for at least one of the sub-partitions with the intra coding.

In an example, the at least one flag is signaled in a picture parameter set (PPS) for one or more pictures including the current picture or in a picture header for the current picture.

In an example, the sub-partitions include at least one slice, at least one tile, or at least one tile group in the current picture.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which:

FIGS. 13A-13D show an example of a high level syntax structure according to an embodiment of the disclosure.

FIGS. 14A-14B show exemplary syntax Tables 1-2 related to an intra-only flag and an inter-only flag, respectively, according to an embodiment of the disclosure.

DETAILED DESCRIPTION OF EMBODIMENTS

Figure 1A:
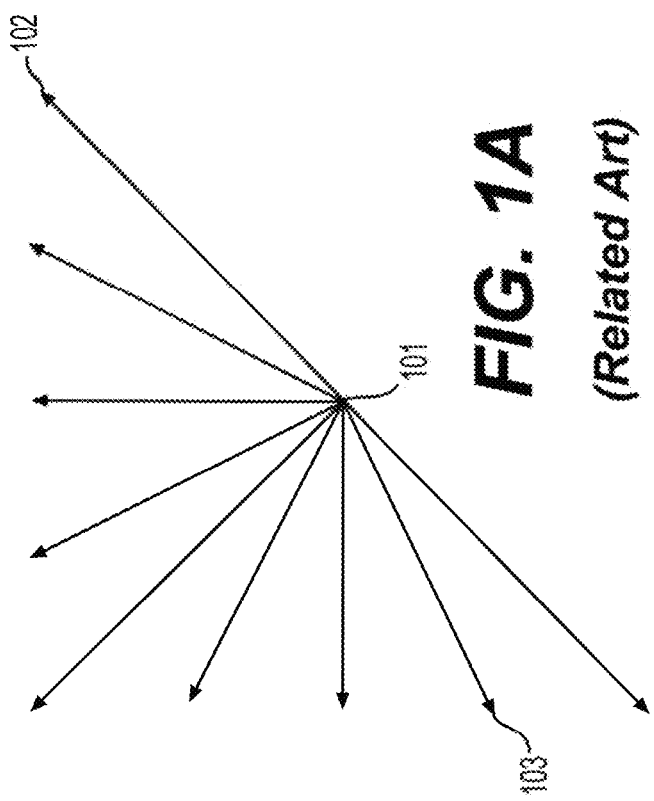
FIG. 1A is a schematic illustration of an exemplary subset of intra prediction modes.
Figure 1B:
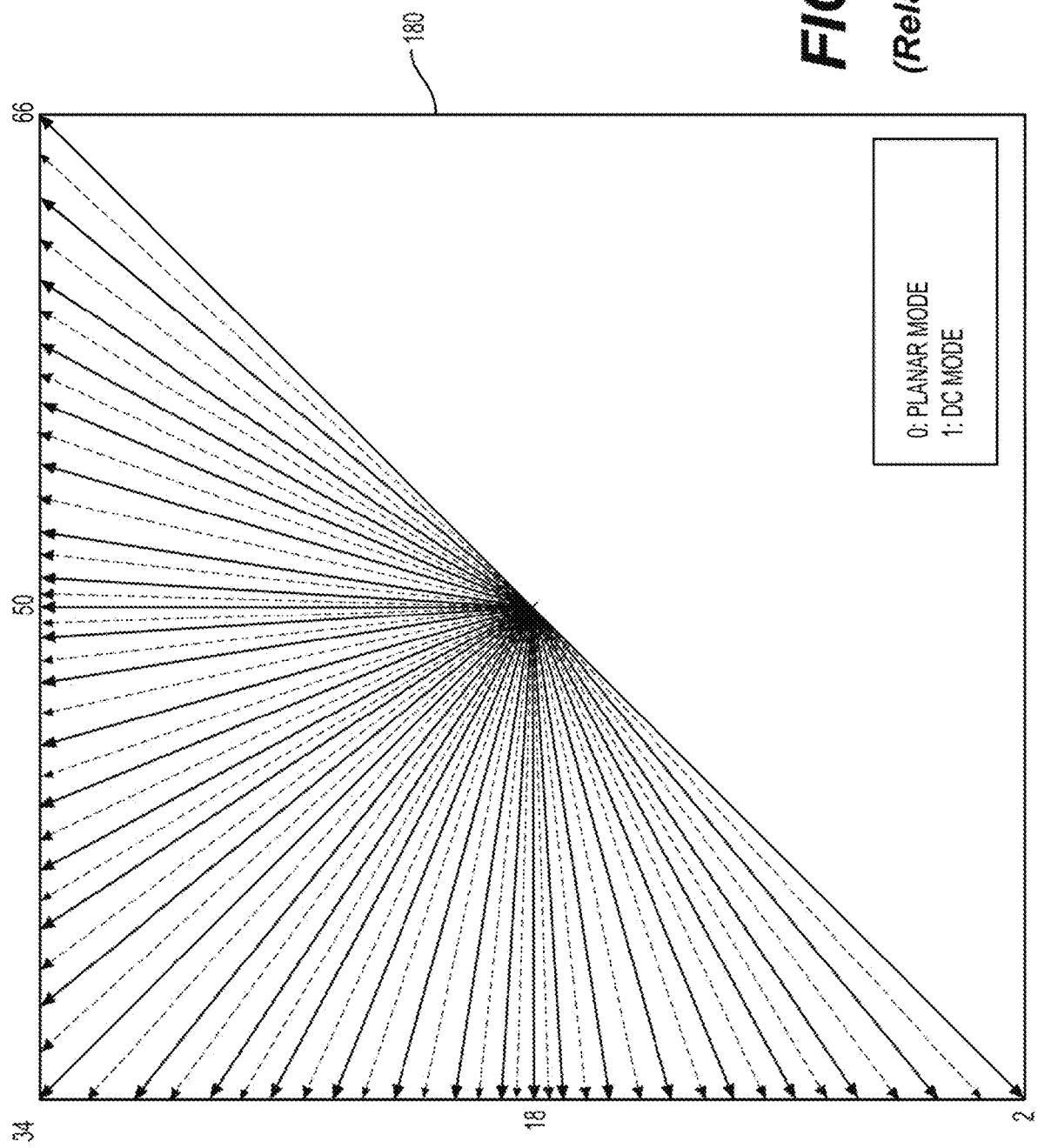
FIG. 1B is an illustration of exemplary intra prediction directions.
Figure 2:
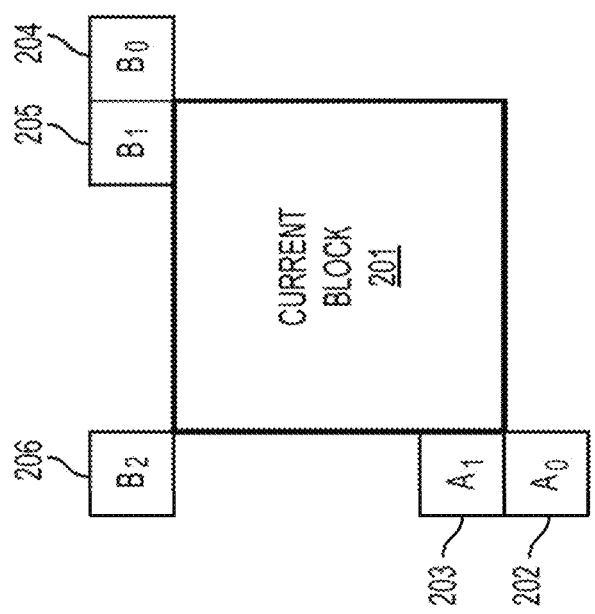
FIG. 2 is a schematic illustration of a current block and its surrounding spatial merge candidates in one example.
Figure 3:
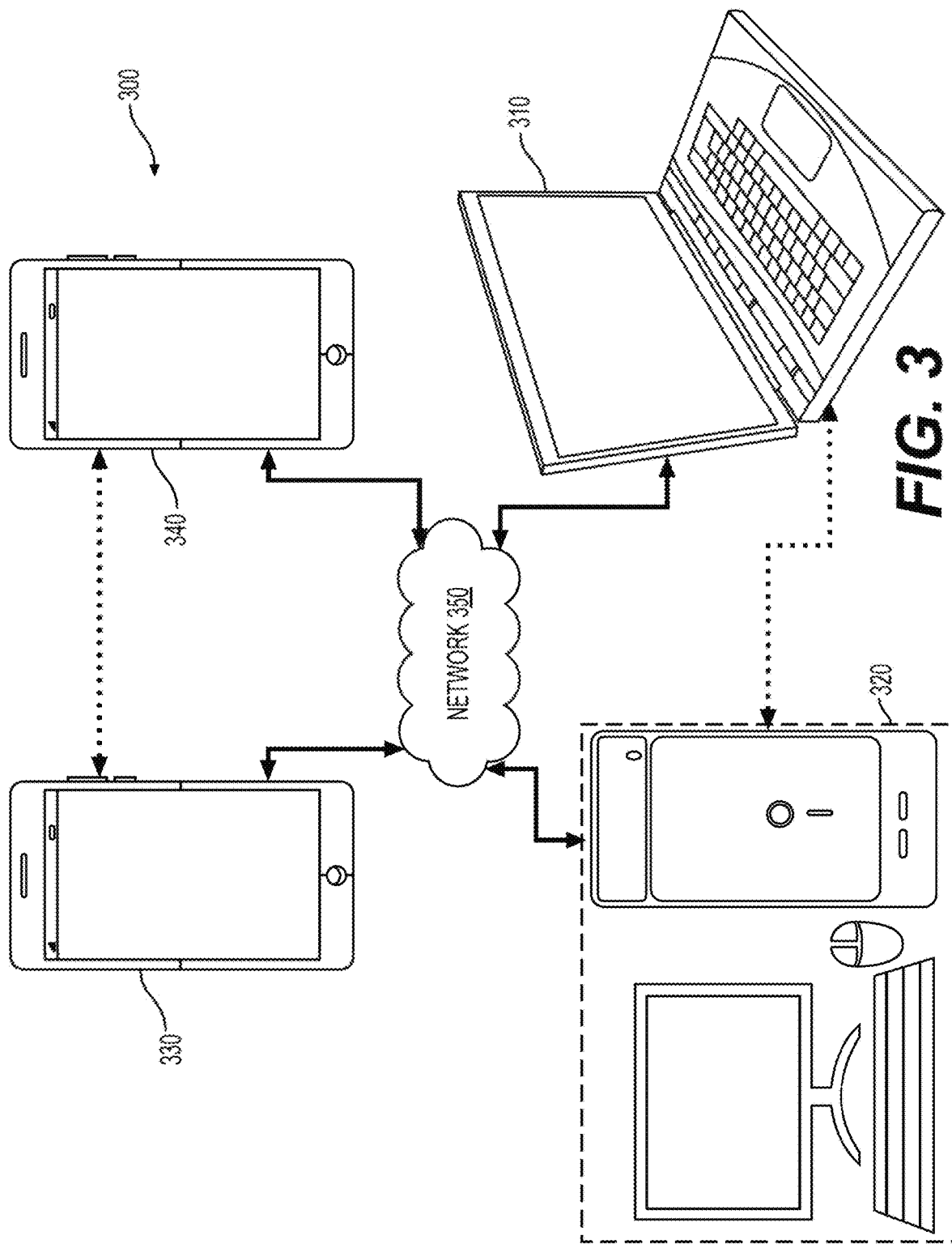
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
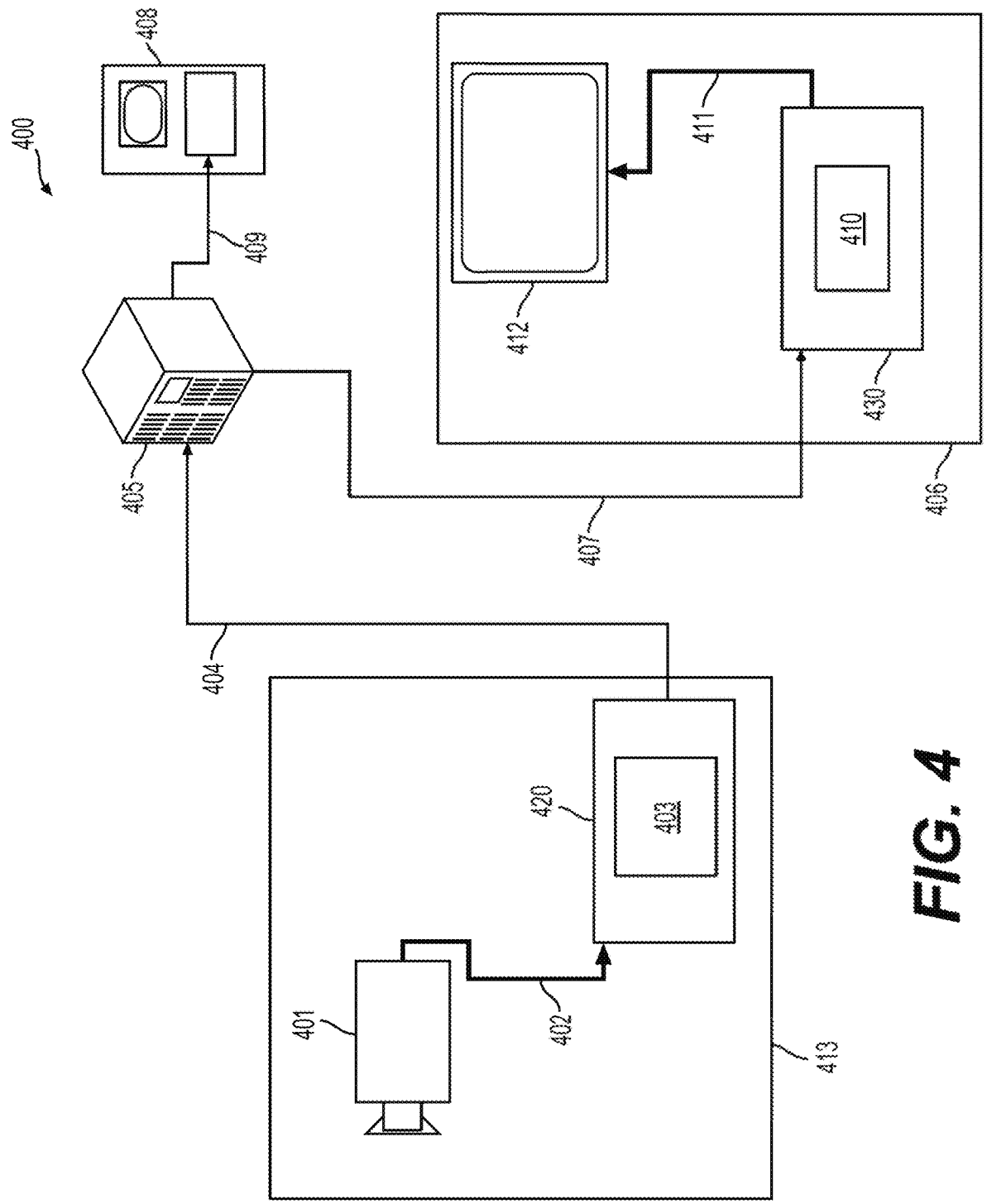
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412)(e.g., display screen) or other rendering device (not depicted). In some streaming systems, the encoded video data (404), (407), and (409)(e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
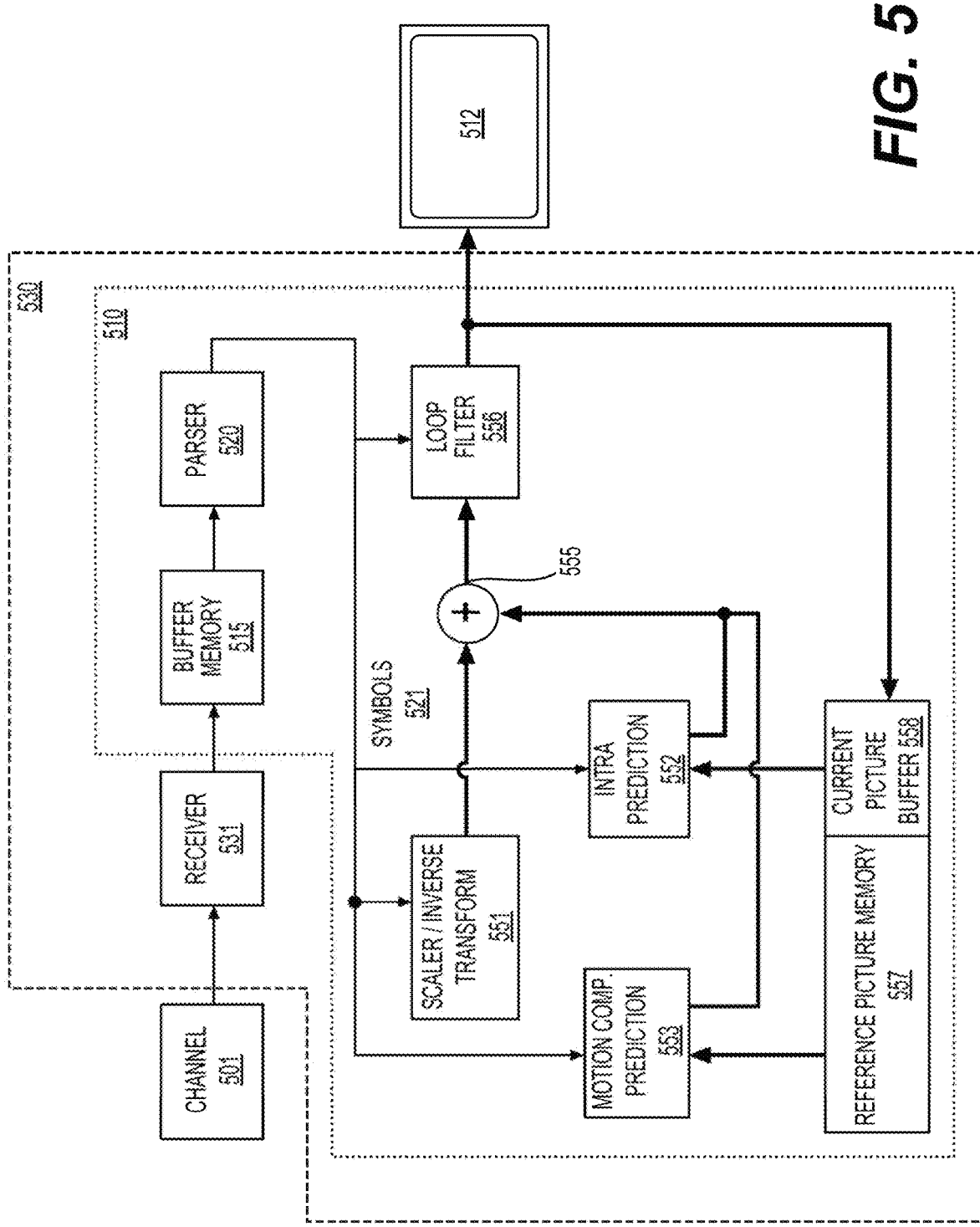
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520)("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512)(e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
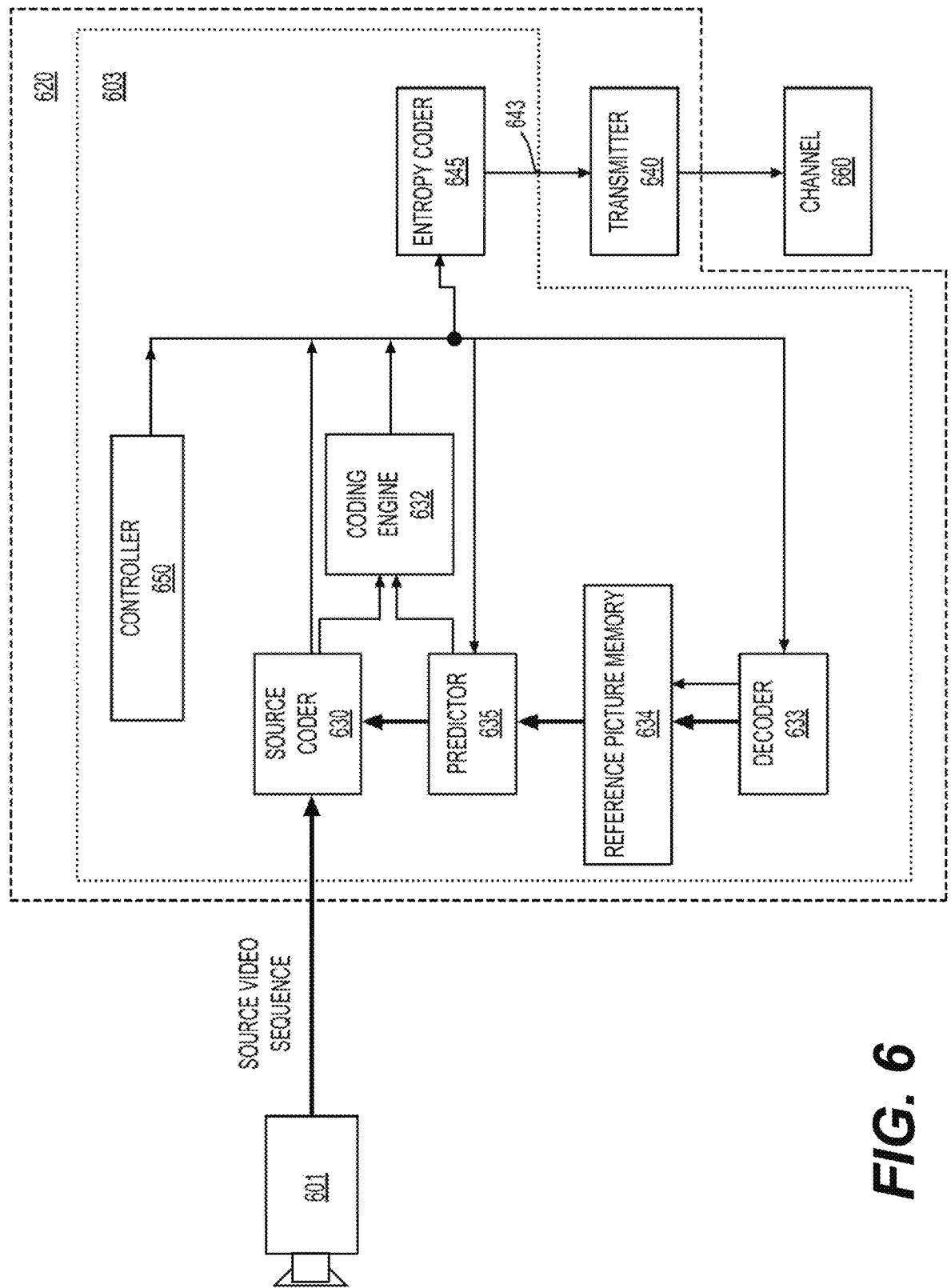
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
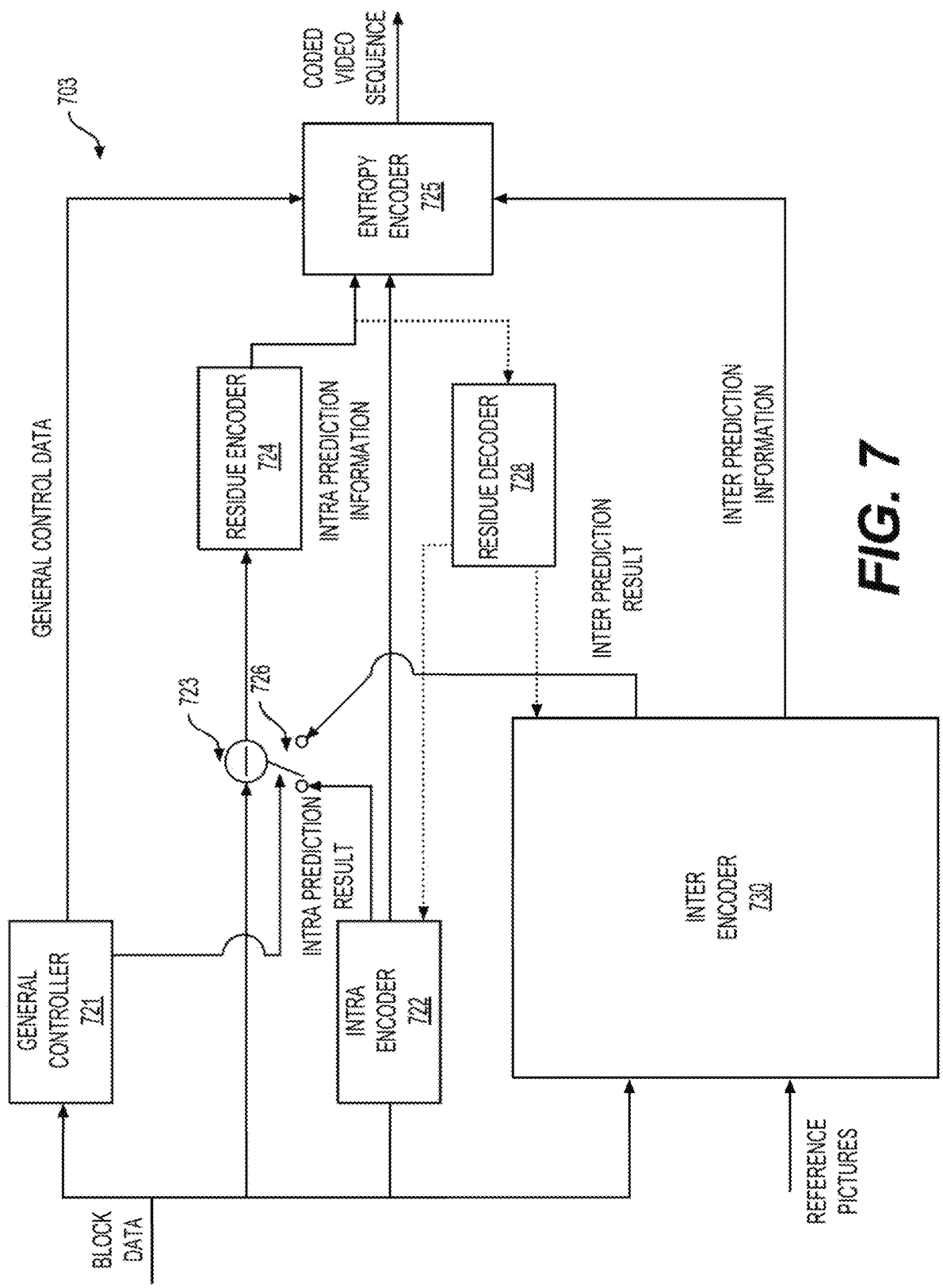
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
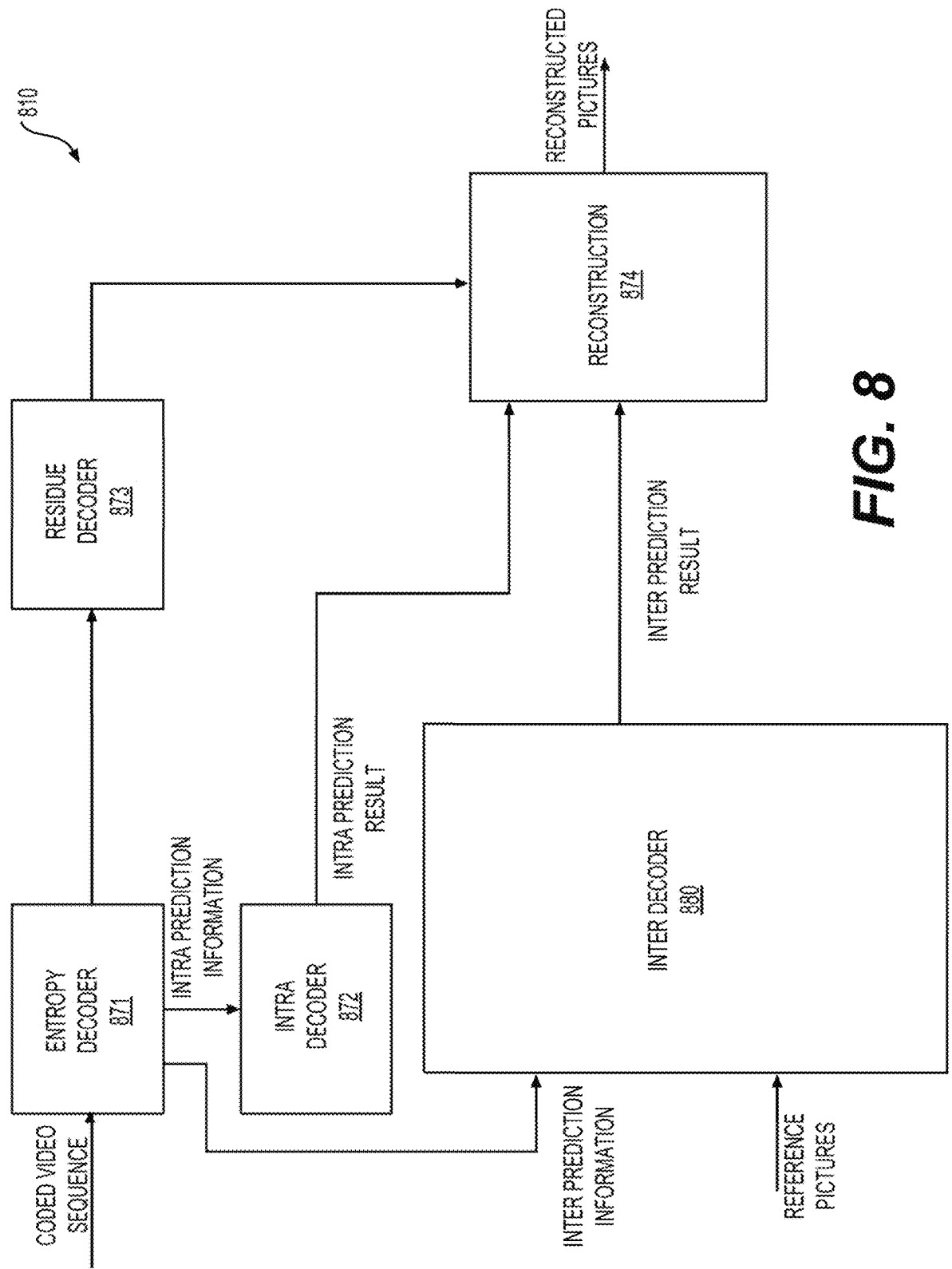
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871)(data path not depicted as this may be low volume control information only).

The reconstruction module (874) is configured to combine, in the spatial domain, the residual as output by the residue decoder (873) and the prediction results (as output by the inter or intra prediction modules as the case may be)

to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

A picture can be partitioned into sub-partitions in the picture, such as subpictures, slices, tiles, tile groups, bricks, and/or the like. A picture can be divided into one or more tile rows and one or more tile columns. A tile can be a sequence of CTUs that covers a rectangular region of a picture. A tile can be divided into one or more bricks, each of which can include a number of CTU rows within the tile. A tile that is not partitioned into multiple bricks can also be referred to as a brick. However, a brick that is a true subset of a tile is not referred to as a tile.

A slice can include a number of tiles in a picture or a number of bricks in a tile. Two modes of slices, e.g., a raster-scan slice mode and a rectangular slice mode, can be supported. In the raster-scan slice mode, a slice can include a sequence of tiles in a tile raster scan of a picture. In the rectangular slice mode, a slice can include a number of bricks of a picture that can collectively form a rectangular region of the picture. The bricks within a rectangular slice are in an order of a brick raster scan of the slice.

Figure 9:
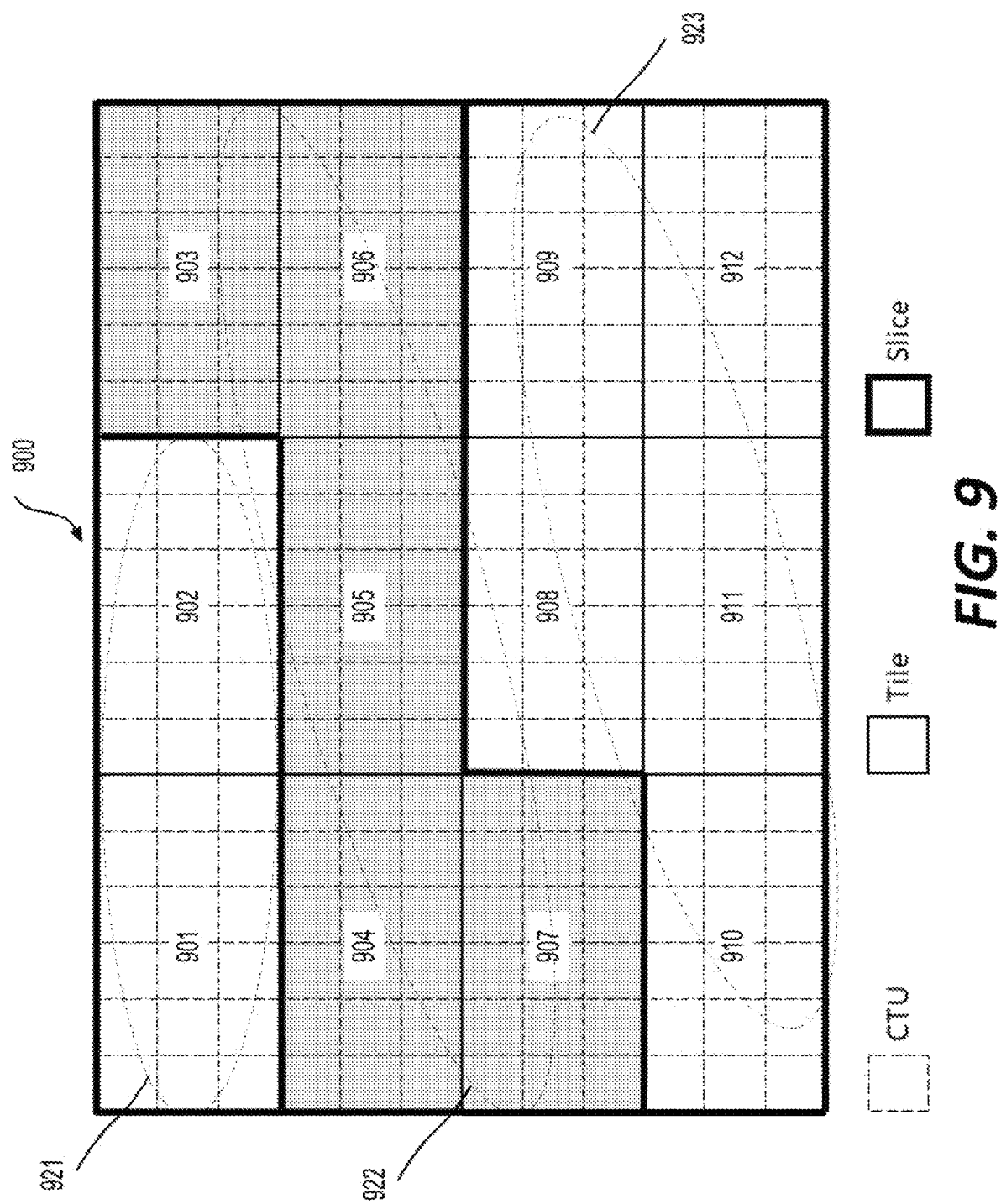
FIG. 9 shows an example of a raster-scan slice partitioning of a picture (900) according to an embodiment of the disclosure.

A picture can be partitioned into tiles and raster-scan slices. FIG. 9 shows an example of a raster-scan slice partitioning of a picture (900) according to an embodiment of the disclosure. The picture (900) can be divided into 12 tiles (901)-(912) (e.g., 12 tiles in 3 columns (or tile columns) and 4 rows (or tile rows)) and 3 raster-scan slices (921)-(923). For example, the raster-scan slice (921) includes the tiles (901)-(902), the raster-scan slice (922) includes the tiles (903)-(907), and the raster-scan slice (923) includes the tiles (908)-(912). In an example, sub-partitions in the picture (900) include the raster-scan slices (921)-(923). In an example, sub-partitions in the picture (900) include the tiles (901)-(912). Alternatively, sub-partitions in the picture (900) include tile groups.

Figure 10:
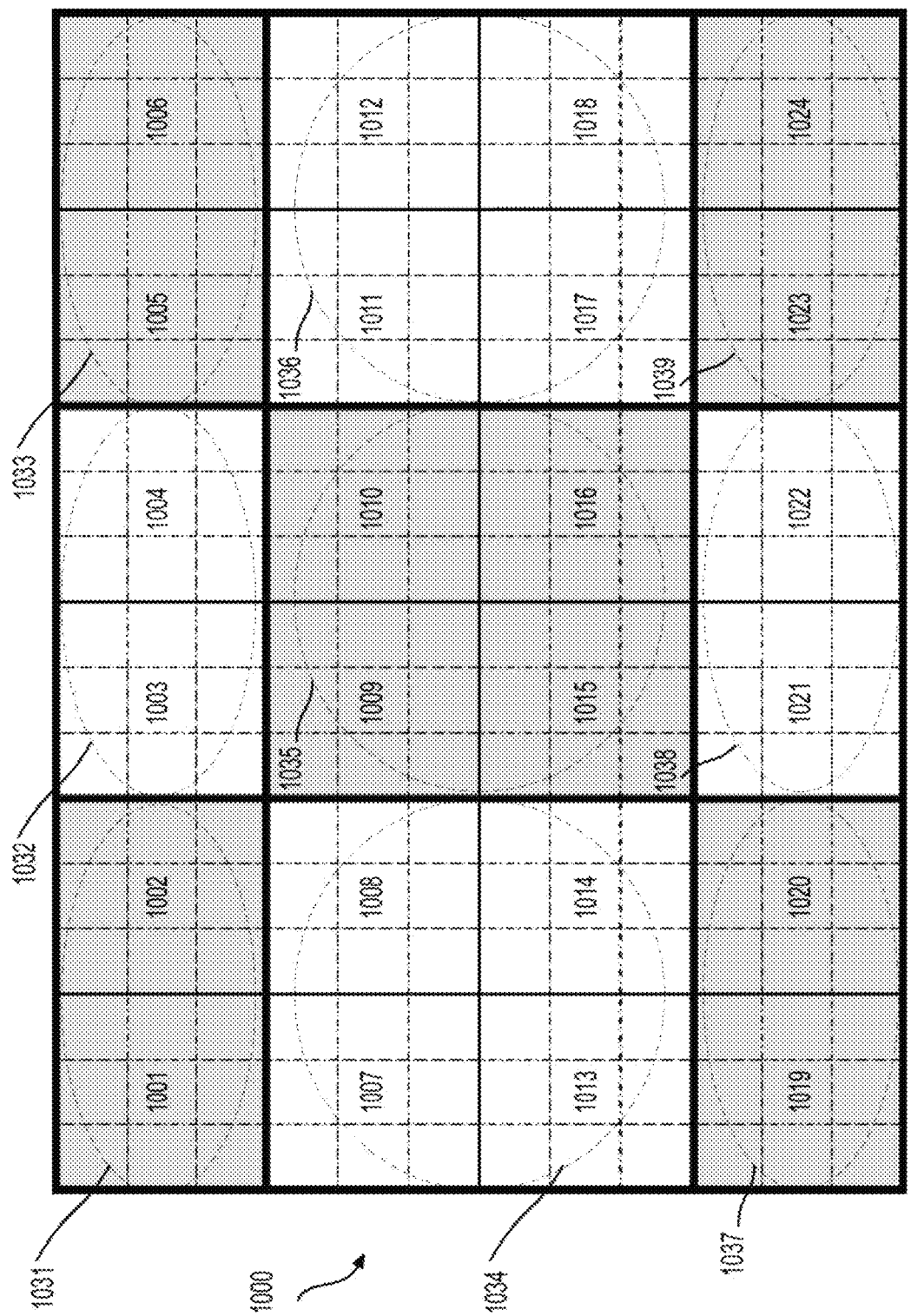
FIG. 10 shows an example of a rectangular slice partitioning of a picture (1000) according to an embodiment of the disclosure.

A picture can be partitioned into tiles and rectangular slices. FIG. 10 shows an example of a rectangular slice partitioning of a picture (1000) according to an embodiment of the disclosure. The picture (1000) can be divided into 24 tiles (1001)-(1024)(e.g., 24 tiles in 6 columns (or tile columns) and 4 rows (or tile rows)) and 9 rectangular slices (1031)-(1039). For example, the rectangular slice (1031) includes the tiles (1001)-(1002); the rectangular slice (1032) includes the tiles (1003)-(1004); the rectangular slice (1033) includes the tiles (1005)-(1006); the rectangular slice (1034) includes the tiles (1007), (1008), (1013), and (1014); the rectangular slice (1035) includes the tiles (1009), (1010), (1015), and (1016); the rectangular slice (1036) includes the tiles (1011), (1012), (1017), and (1018); the rectangular slice (1037) includes the tiles (1019)-(1020); the rectangular slice (1038) includes the tiles (1021)-(1022); and the rectangular slice (1039) includes the tiles (1023)-(1024). In an example, sub-partitions in the picture (1000) include the rectangular slices (1031)-(1039). In an example, sub-partitions in the picture (1000) include the tiles (1001)-(1024).

Figure 11:
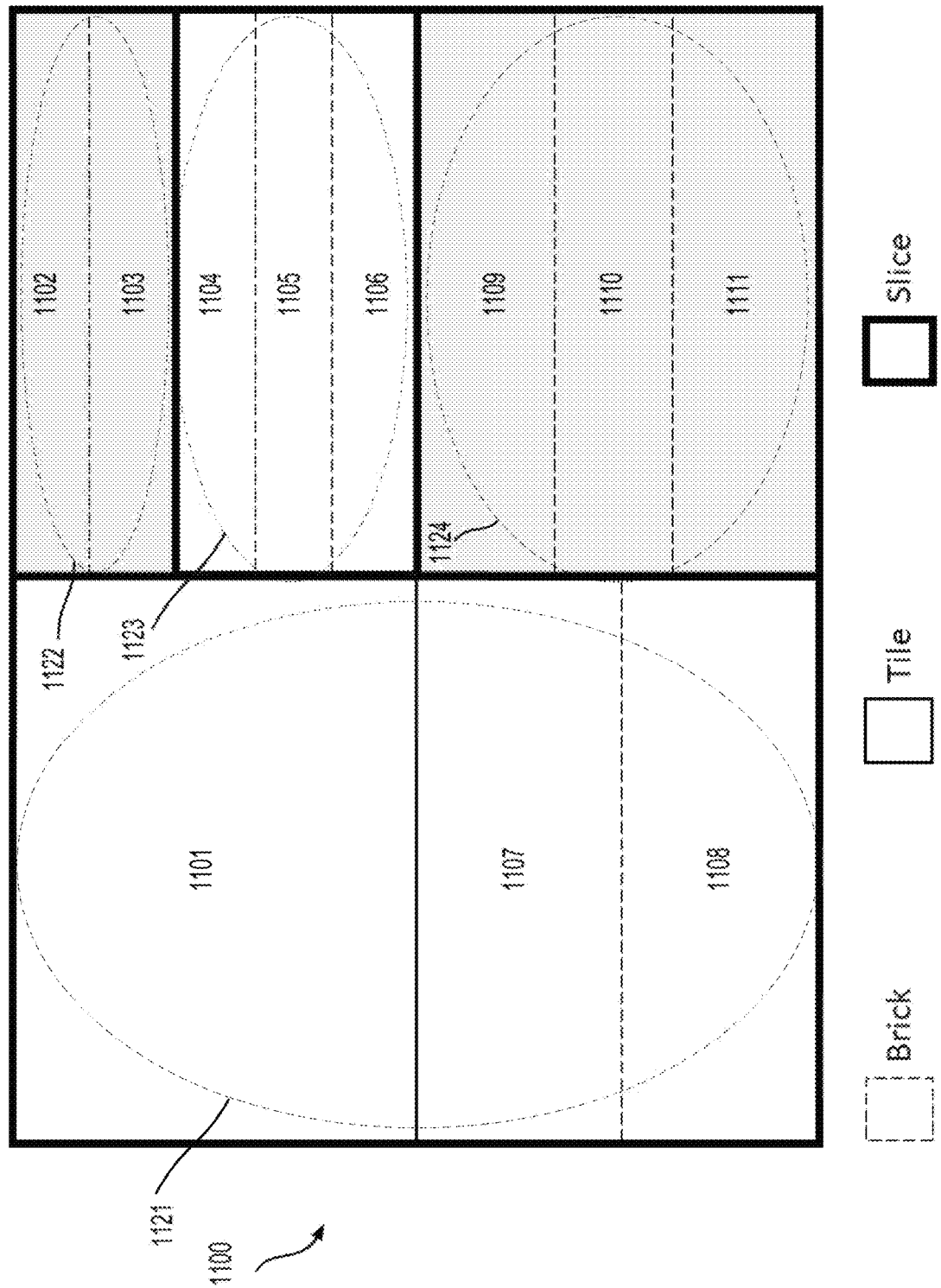
FIG. 11 shows an example of a picture (1100) partitioned into tiles, bricks (1101)-(1111), and rectangular slices (1121)-(1124) according to an embodiment of the disclosure.

A picture can be partitioned into tiles, bricks, and rectangular slices. FIG. 11 shows an example of a picture (1100) partitioned into tiles, bricks (1101)-(111), and rectangular slices (1121)-(1124) according to an embodiment of the disclosure. The picture (1100) can be divided into the four tiles (e.g., two tile columns and two tile rows), the eleven bricks (1101)-(1111), and the four rectangular slices (1121)-(1124). The top-left tile includes one brick (101), the top-right tile includes five bricks (1102)-(1106), the bottom-left tile includes two bricks (1107)-(1108), and the bottom-right tile includes three bricks (1109)-(111). The rectangular slice (1121) includes the bricks (1101), (1107), and (1108); the rectangular slice (1122) includes the bricks (1102) and (1103); the rectangular slice (1123) includes the bricks (1104)-(1106); and the rectangular slice (1124) includes the bricks (1109)-(111). In an example, sub-partitions in the picture (1100) include the rectangular slices (1121)-(1124).

Figure 12:
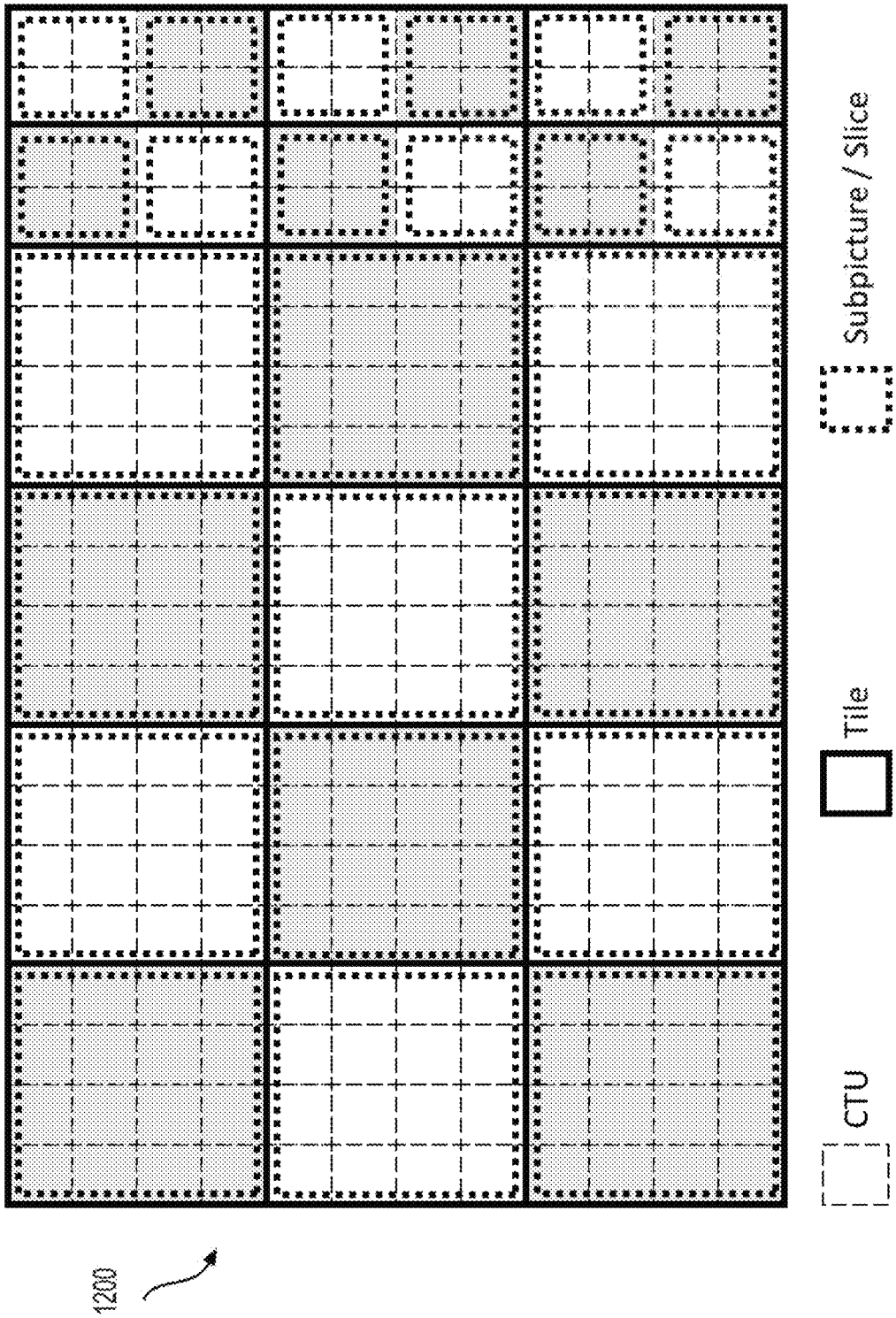
FIG. 12 shows an example of subpicture partitioning of a picture (1200) according to an embodiment of the disclosure.

FIG. 12 shows an example of subpicture partitioning of a picture (1200) according to an embodiment of the disclosure. The picture (1200) can be partitioned into 18 tiles, 24 slices, and 24 subpictures. In the example shown in FIG. 12, each of the 24 slices corresponds to and is identical to a different one of the 24 subpictures. Each of the 12 tiles on a left side of the picture (1200) covers a slice including 4 by 4 CTUs and each of the 6 tiles on a right side of the picture (1200) covers two vertically-stacked slices including 2 by 2 CTUs. The 24 slices as well as the 24 subpictures have varying dimensions.

The disclosure includes embodiments related to high level syntax (HLS) control for video coding.

High level syntax or high level syntax structure for a high level coding layer can specify parameters that can be shared by lower level coding layers. For example, a CTU size or a maximum size of a coding block is specified at a sequence level or in a sequence parameter set (SPS) and is not changed from one picture to another picture. Exemplary HLS can include a SPS, a picture parameter set (PPS), a picture header, a slice header, an adaptive parameter set (APS), and the like.

Each HLS can have a specific coverage range, such as a spatial range. A PPS can specify common syntax elements that may be shared by one or more pictures. A picture header can specify common syntax elements used within a picture. HLS of a lower level can override what is provided in HLS of a higher level for which the lower level refers to. For example, a picture header of a current picture may override what is provided in a PPS for which the current picture refers to. A slice header that belongs to the current picture may override one or more syntax elements (also referred to as parameters) that are assigned in the picture header of the current picture.

In general, common syntax elements that are signaled at each slice header may be put in a picture header if the common syntax elements do not vary from one slice to another slice.

In some examples using picture headers and slice headers, certain syntax elements in a slice header or in a picture header are specific for certain coding tools. The certain syntax elements can be used when the certain coding tools are used. In some scenarios, the certain syntax elements are not needed when the certain coding tools are not used. Thus, the certain syntax elements may not be in use all the time. Signaling unused syntax elements in a header (e.g., a slice header, a picture header) may not be necessary. Designing a proper syntax structure in a HLS where syntax elements at each layer of HLS are properly structured is beneficial, for example, to improve coding efficiency by not sending syntax elements that will not be used in video coding.

According to aspects of the disclosure, a high level flag (also referred to as a high level control flag) can be signaled, but is not limited to be signaled, at one or more levels including a level (e.g., a SPS, a PPS) corresponding to one or more pictures, a picture level (e.g., a picture header), and/or a sub-partition level corresponding to a sub-partition in a picture. The sub-partition can include a slice (e.g., a slice header), a tile, a tile group, or the like, and thus the sub-partition level can include a slice level, a tile level, a tile group level, or the like. In an embodiment, the high level flag is signaled at one or more of the following levels, a SPS, a PPS, a picture header, a slice header, a tile, a tile group, and any suitable sub-picture level.

In some embodiments, the coding tools include inter coding for coding sub-partitions in a picture and the sub-partitions with inter coding can be referred to as inter-coded sub-partitions. In an example, the inter-coded sub-partitions include inter-coded slices, inter-coded tiles, or the like. The coding tools include only intra coding for coding sub-partitions in the picture and the sub-partitions with only intra coding can be referred to as intra-coded sub-partitions. In an example, the intra-coded sub-partitions include intra-coded slices, intra-coded tiles, or the like. Note that sub-partitions with inter coding or inter-coded sub-partitions may or may not include intra coding or intra prediction.

Certain syntax elements or parameters (e.g., a set of syntax elements or parameters) are only used or considered for the inter coding or for inter prediction of inter-coded sub-partitions (e.g., inter-coded slices), and thus the certain syntax elements can be referred to as inter syntax elements that are used only for the inter coding or exist only in inter-coded sub-partitions. The inter syntax elements can be signaled at any suitable level. According to aspects of the disclosure, the inter syntax elements can be signaled in a high level, for example, in a HLS. The inter syntax elements can include any suitable syntax elements, for example, used or considered only for inter prediction. The inter syntax elements can include, but are not limited to, one or more of the following syntax elements: a maximum number of merging candidates, a maximum number of affine or sub-block based merging candidates, a maximum number of triangular merging candidates, a number of reference picture index or indices in a reference picture List 0 (L0), a number of reference picture index or indices in a reference picture List 1 (L1), a temporal motion vector prediction (TMVP) enabled flag and a reference index pointing to a collocated picture, a slice level decoder side motion vector refinement (DMVR) and bi-directional optical flow (BDOF) enabling flag, a slice level fractional pel disabling flag for merge mode with motion vector difference (MMVD), a mvd_l1_zero_flag, a cabac_init_flag, a temporal_mvp_enabled_flag, a collocated_from_l0_flag, a collocated_ref_idx, and/or the like. In some examples, whether the inter syntax elements or a subset of the inter syntax elements are signaled is further determined, for example, by additional flag(s).

In an embodiment, certain syntax elements or parameters (e.g., a set of syntax elements or parameters) are only used or considered for the intra coding or for intra prediction of intra-coded sub-partitions (e.g., intra-coded slices), and thus the certain syntax elements can be referred to as intra syntax elements that are used only for the intra coding or exist only in intra-coded sub-partitions. The intra syntax elements can be signaled at any suitable level. According to aspects of the disclosure, the intra syntax elements can be signaled in a high level, for example, in a HLS. The intra syntax elements can include any suitable syntax elements, for example, used or considered only for intra prediction. The intra syntax elements can include, but are not limited to, one or more of the following syntax elements: dual-tree related syntax elements (e.g., all the dual-tree related syntax elements) which can apply to intra-coded slices only, such as log 2_diff_min_qt_min_cb_chroma (e.g., slice log 2 diff_min_qt_min_cb_chroma at a slice level), a max_mtt_hierarchy_depth_chroma (e.g., slice_max_mtt_hierarchy_depthchroma at a slice level), log 2 diff_max_bt_min_qt_chroma (e.g., pic_log 2_diff_max_bt_min_qt_chroma at a picture level), log 2_diff_max_tt_min_qt_chroma (e.g., pic_log 2_diff_max_tt_min_qt_chroma). In some examples, whether the intra syntax elements or a subset of the intra syntax elements are signaled is further determined, for example, by additional flag(s).

According to aspects of the disclosure, coding information for one or more pictures including a current picture can be received from a coded video bitstream. At least one flag in the coding information can indicate one or more allowable coding types for sub-partitions in the current picture. The one or more allowable coding types can include at least one of intra coding and inter coding for the sub-partitions. Whether to decode intra syntax elements used only for coding intra sub-partitions and whether to decode inter syntax elements used only for coding inter sub-partitions can be determined based on the at least one flag. The intra syntax elements in the coding information can be decoded based on the intra syntax elements being determined to be decoded. The inter syntax elements in the coding information can be decoded based on the inter syntax elements being determined to be decoded. In an example, the at least one flag is signaled in a PPS for the one or more pictures including the current picture. In an example, the at least one flag is signaled in a picture header for the current picture. The sub-partitions can include any suitable partitions in the current picture, such as slice(s), tile(s), and/or tile group(s) in the current picture.

The at least one flag can include a first flag indicating whether an inter-coded sub-partition is allowed in the current picture and/or a second flag indicating whether an intra-coded sub-partition is allowed in the current picture.

The first flag can be an inter-sub-partition-allowed flag for the current picture, such as an inter-slice-allowed flag or a ph_inter_slice_allowed_flag. The first flag being equal to 0 (or false) can indicate that all coded sub-partitions (e.g., slices) of the current picture have the coding type of intra coding, for example, all coded slices being I slices or a slice type (e.g., sh_slice_type) being equal to 2, and thus no inter-coded sub-partition is allowed in the current picture. The first flag being equal to 1 (or true) can indicate that the coding type of inter coding is allowed in the current picture. Thus, there may or may not be one or more inter-coded sub-partitions (e.g., slices) in the current picture. The inter-coded sub-partition(s) can include B slice(s)(e.g., a slice type being equal to 0) and/or P slice(s) (e.g., a slice type being equal to 1). When the first flag is equal to 1, intra coding sub-partitions may or may not be allowed in the current picture.

The second flag can be an intra-sub-partition-allowed flag for the current picture, such as an intra-slice-allowed flag or a ph_intra_slice_allowed_flag. The second flag being equal to 0 (or false) can indicate that all coded sub-partitions (e.g., slices) of the current picture have the coding type of inter coding, for example, all coded slices being B and/or P slices, and thus no intra-coded sub-partition is allowed in the current picture. The second flag being equal to 1 (or true) can indicate that the coding type of intra coding is allowed in the current picture. Thus, there may or may not be one or more intra-coded sub-partitions (e.g., slices) in the current picture. The intra-coded sub-partition(s) can include I slice(s). When the second flag is equal to 1, inter coding sub-partitions may or may not be allowed in the current picture.

In an example, when the second flag (e.g., a ph_intra_slice_allowed_flag) is not present, for example, when the second flag is not signaled, a value of the second flag can be inferred to be equal to 1. In an example, when the second flag is not signaled, the value of the second flag is inferred to be equal to 1 and the inter coding is not allowed in the current picture.

In an embodiment, the first flag is false indicating that no inter-coded sub-partition is allowed in the current picture. Therefore, the at least one flag can include only the first flag and does not need to include the second flag. FIGS. 13A-13D show an example of a high level syntax structure according to an embodiment of the disclosure. For example, the at least one flag includes only the first flag, as indicated by a box (1310) in FIG. 13A. Although the second flag is not signaled, the value of the second flag can be inferred to be 1, as described above. The one or more allowable coding types correspond to the intra coding for the sub-partitions. Thus, all the coded sub-partitions (e.g., slices) of the current picture are intra-coded. For example, all coded slices are I slices. Accordingly, no inter syntax element is needed to be signaled, and thus no inter syntax element needs to be decoded for the current picture. Further, the intra syntax elements can be signaled in a HLS and thus can be determined to be decoded for the sub-partitions, as indicated by boxes (1311)-(1312) in FIGS. 13B and 13C. Which one(s) of the intra syntax elements are signaled and to be decoded can be further determined based on additional flags, as shown by the boxes (1311)-(1312) in FIGS. 13B and 13C.

In an embodiment, the at least one flag can include the first flag and the second flag. The first flag can indicate that no inter-coded sub-partition is allowed in the current picture. The second flag can indicate that the intra-coded sub-partition is allowed in the current picture. Accordingly, the one or more allowable coding types correspond to the intra coding for the sub-partitions. Thus, all the coded sub-partitions (e.g., slices) of the current picture are intra-coded and are intra sub-partitions. In an example, no inter syntax element is to be decoded for the current picture. Further, the intra syntax elements can be decoded for the sub-partitions.

In an embodiment, the first flag is true and indicates that the inter-coded sub-partition is allowed in the current picture. The at least one flag can include the first flag and the second flag. The inter syntax elements can be signaled in HLS, and thus can be determined to be decoded for at least one of the sub-partitions with the inter coding, as shown by a box (1313) in FIG. 13C. Which one(s) of the inter syntax elements are signaled and to be decoded can be further determined based on additional flags, as shown by the box (1313) in FIG. 13C. If the second flag is false indicating that no intra-coded sub-partition is allowed in the current picture, the one or more allowable coding types is determined to be the inter coding for the sub-partitions, and no intra syntax element is to be decoded for the current picture. If the second flag is true indicating that the intra-coded sub-partition is allowed in the current picture, the one or more allowable coding types can include the inter coding and the intra coding for the sub-partitions. The intra syntax elements can be signaled in HLS, as indicated by the boxes (1311)-(1312) in FIGS. 13B and 13C. The intra syntax elements can be decoded for at least one of the sub-partitions with the intra coding. Which one(s) of the intra syntax elements are signaled and to be decoded can be further determined based on additional flags, as shown by the boxes (1311)-(1312) in FIGS. 13B and 13C.

According to aspects of the disclosure, a high level flag (or a high level control flag) associated with a high level coding layer can indicate that a set of parameters (e.g., intra syntax elements or inter syntax elements) for a specific coding tool (e.g., intra coding or inter coding) is to be used for one or more low level coding layers corresponding to a high level coding layer. In some examples, the set of parameters is only used for or is applicable to certain low level partitions (e.g., sub-partitions in a picture) within a high level partition (e.g., the picture that includes the sub-partitions) when the specific coding tool is used for or is applicable to the certain low level partitions within the high level partition. Thus, the set of parameters can be signaled in a HLS (e.g., a picture header, a PPS) for the high level partition (e.g., the picture) only when the specific coding tool is used for at least one of the certain low level partitions. When the specific coding tool is not used for or is not applicable to any of the certain low level partitions, the set of parameters is not signaled in the HLS for the high level partition, and thus may improve coding efficiency by reducing a number of syntax elements signaled in the HLS. Further, an encoder and/or a decoder do not need to code the set of parameters. For example, the set of parameters only needs to be signaled in the HLS for the high level Partition when the specific coding tool is used for the at least one of the certain low level partitions.

In an example, inter syntax elements or inter-prediction related syntax elements only need to be signaled (e.g., in a picture header or a PPS) when a picture includes at least one inter-coded sub-partition (e.g., at least one inter-coded slice). Otherwise, when the picture includes no inter-coded sub-partition, all the inter syntax elements do not need to be signaled, for example, no inter syntax element is signaled.

According to aspects of the disclosure, the at least one flag can include a third flag indicating whether the sub-partitions include only intra-coded sub-partitions with the intra coding and/or a fourth flag indicating whether the sub-partitions include only inter-coded sub-partitions with the inter coding.

Since the third flag can indicate whether the sub-partitions include only the intra-coded sub-partitions with the intra coding, the third flag can indicate whether an inter-coded sub-partition is allowed in the current picture. For example, if the third flag indicates the sub-partitions include only the intra-coded sub-partitions, then an inter-coded sub-partition is not allowed in the current picture. Otherwise, if the third flag indicates the sub-partitions include not only the intra-coded sub-partitions, then an inter-coded sub-partition is allowed in the current picture. Therefore, the first flag and the third flag can both indicate whether an inter-coded sub-partition is allowed in the current picture.

Since the fourth flag can indicate whether the sub-partitions include only the inter-coded sub-partitions with the inter coding, the fourth flag can indicate whether an intra-coded sub-partition is allowed in the current picture. For example, if the fourth flag indicates the sub-partitions include only the inter-coded sub-partitions, then an intra-coded sub-partition is not allowed in the current picture. Otherwise, if the fourth flag indicates the sub-partitions include not only the inter-coded sub-partitions, then an intra-coded sub-partition is allowed in the current picture.

Therefore, the second flag and the fourth flag can both indicate whether an inter-coded sub-partition is allowed in the current picture.

In an embodiment, the third flag (e.g., a high level control flag in a picture header) is referred to as an intra-only flag (e.g., a pic_intra_only_flag). The intra-only flag can be signaled to indicate if all sub-partitions (e.g., slices) of the picture have intra coding (or intra prediction, non-inter related prediction) only. Accordingly, the intra-only flag is signaled to indicate if an inter-coded sub-partition or inter coding is allowed in the current picture. When the intra-only flag is true, all the sub-partitions of the picture have intra coding only and no inter-coded sub-partition or inter coding is allowed in the current picture. Otherwise, when the intra-only flag is false, then not all the sub-partitions of the picture have intra coding and an inter-coded sub-partition or inter coding is allowed in the current picture.

When the intra-only flag is true, only intra syntax elements (or intra coding related syntax elements) need to be signaled in the picture header. Otherwise, when the intra-only flag is false, the intra syntax elements can be signaled.

In an example, intra syntax elements (e.g., all the intra syntax elements) or intra-prediction related syntax elements used only for intra sub-partitions only need to be signaled (e.g., in a picture header or a PPS) when a picture includes at least one intra-coded sub-partition (e.g., at least one intra-coded slice). Otherwise, when the picture includes no intra-coded sub-partition, the intra syntax elements do not need to be signaled, for example, no intra syntax element is signaled.

In an embodiment, the fourth flag (e.g., a high level control flag in a picture header) is referred to as an inter-only flag (e.g., a pic_inter_only_flag). The inter-only flag can be signaled to indicate if all sub-partitions (e.g., slices) of the picture have inter coding (or inter prediction, non-intra related prediction) only. Accordingly, the inter-only flag is signaled to indicate if an intra-coded sub-partition or intra coding is allowed in the current picture. When the inter-only flag is true, all the sub-partitions of the picture have inter coding only and no intra-coded sub-partition or intra coding is allowed in the current picture. Otherwise, when the inter-only flag is false, then not all the sub-partitions of the picture have inter coding and an intra-coded sub-partition or intra coding is allowed in the current picture. When the inter-only flag is true, intra syntax elements do not need to be signaled in the picture header. For example, only inter syntax elements (or inter coding related syntax elements) need to be signaled in the picture header. Otherwise, when the inter-only flag is false, one or more intra sub-partitions may be used in the picture, and the intra syntax elements can be signaled.

FIGS. 14A-14B show exemplary syntax Tables 1-2 related to the intra-only flag (e.g., pic_intra_only_flag) and the inter-only flag (e.g., pic_inter_only_tlag), respectively, according to the disclosure. Referring to FIG. 14A, when the intra-only flag is true, the inter syntax elements (e.g., pic_temporal_mvp_enabled_flag, mvd_l1_zero_flag, pic_six_minus_max_num_merge_cand, pic_five_minus_max_num_subblock_merge_cand, pic_fpel_mmvd_enabled_flag, pic_disable_bdof_dmvr_flag, and pic_max_num_merge_cand_minus_max_num_triangle_cand) are not signaled. When the intra-only flag is false, the inter syntax elements can be signaled. Which one(s) of the inter syntax elements are signaled can be determined based on additional flags, such as shown in FIG. 14A.

Referring to FIG. 14B, when the inter-only flag is true, the intra syntax elements (e.g., pic_log 2_diff_min_qt_min_cb_chroma, pic_max_mtt_hierarchy_depth_chroma, pic_log 2_diff_max_bt_min_qt_chroma, pic_log 2_diff_max_tt_min_qt_chroma) are not signaled. When the inter-only flag is false, the intra syntax elements can be signaled. Which one(s) of the intra syntax elements are signaled can be determined based on additional flags, such as shown in FIG. 14B.

Based on the descriptions for FIGS. 14A-14B, when the intra-only flag is true, the inter syntax elements are not signaled and only the intra syntax elements can be signaled. In an example, the at least one flag includes only the third flag (or the intra-only flag), and the third flag indicates that the sub-partitions in the current picture include only the intra-coded sub-partitions. Thus, no inter syntax element is signaled and no inter syntax element is to be decoded for the current picture. The intra syntax elements can be determined to be decoded for the intra-coded sub-partitions.

When the inter-only flag is true, the intra syntax elements are not signaled, and only the inter syntax elements can be signaled. In an example, the at least one flag includes only the fourth flag (or the inter-only flag), and the fourth flag indicates that the sub-partitions in the current picture include only the inter-coded sub-partitions. Thus, no intra syntax element is signaled and no intra syntax element is to be decoded for the current picture. The inter syntax elements can be determined to be decoded for the inter-coded sub-partitions.

When both the inter-only flag and the intra-only flag are false, the intra syntax elements and the intra syntax elements can be signaled, for example, depending on the additional conditions listed in FIG. 14A-14B. In an example, the at least one flag includes the third flag and the fourth flag indicating that the sub-partitions in the current picture include at least one intra-coded sub-partition with the intra coding and at least one inter-coded sub-partition with the inter coding. The inter syntax elements can be determined to be decoded for the at least one inter-coded sub-partition. The intra syntax elements can be determined to be decoded for the at least one intra-coded sub-partition.

According to aspects of the disclosure, the first flag or the third flag can indicate whether an inter-coded sub-partition is allowed in the current picture and whether the sub-partitions include only intra-coded sub-partitions with the intra coding.

In some examples, the first flag or the third flag determines the one or more allowable coding types for the sub-partitions in the current picture, and thus the second flag and the fourth flag are not needed. For example, when the first flag is false or the third flag is true, the first flag or the third flag indicates that an inter-coded sub-partition is not allowed in the current picture and the sub-partitions include only intra-coded sub-partitions with the intra coding.

According to aspects of the disclosure, the second flag or the fourth flag can indicate whether an intra-coded sub-partition is allowed in the current picture and whether the sub-partitions include only inter-coded sub-partitions with the inter coding.

In some examples, the second flag or the fourth flag determines the one or more allowable coding types for the sub-partitions in the current picture, and thus the first flag and the third flag are not needed. For example, when the second flag is false or the fourth flag is true, the second flag or the fourth flag indicates that an intra-coded sub-partition is not allowed in the current picture and the sub-partitions include only inter-coded sub-partitions with the inter coding.

According to aspects of the disclosure, a picture can have a picture type, such as an intra picture, an inter picture, or the like. Thus, the high level control flags (e.g., pic_intra_only_flag and pic_inter_only_flag) may not need to be signaled and corresponding values for the high level control flags can be derived from the picture type. In an example, the picture type is signaled in HLS.

In an example, if a current picture has a picture type as an intra-only picture (e.g., all slices in the current picture are I slices), then the pic_intra_only_flag may be inferred to be true. In another example, if the current picture has a picture type as an inter-only picture (e.g., all slices in the current picture are P or B slices), the pic_inter_only_flag may be inferred to be true. In another example, if the current picture has a picture type indicating both an intra slice and an inter slice are allowable in the current picture, both the pic_intra_only_flag and the pic_inter_only_flag can be inferred to be false.

Figure 15:
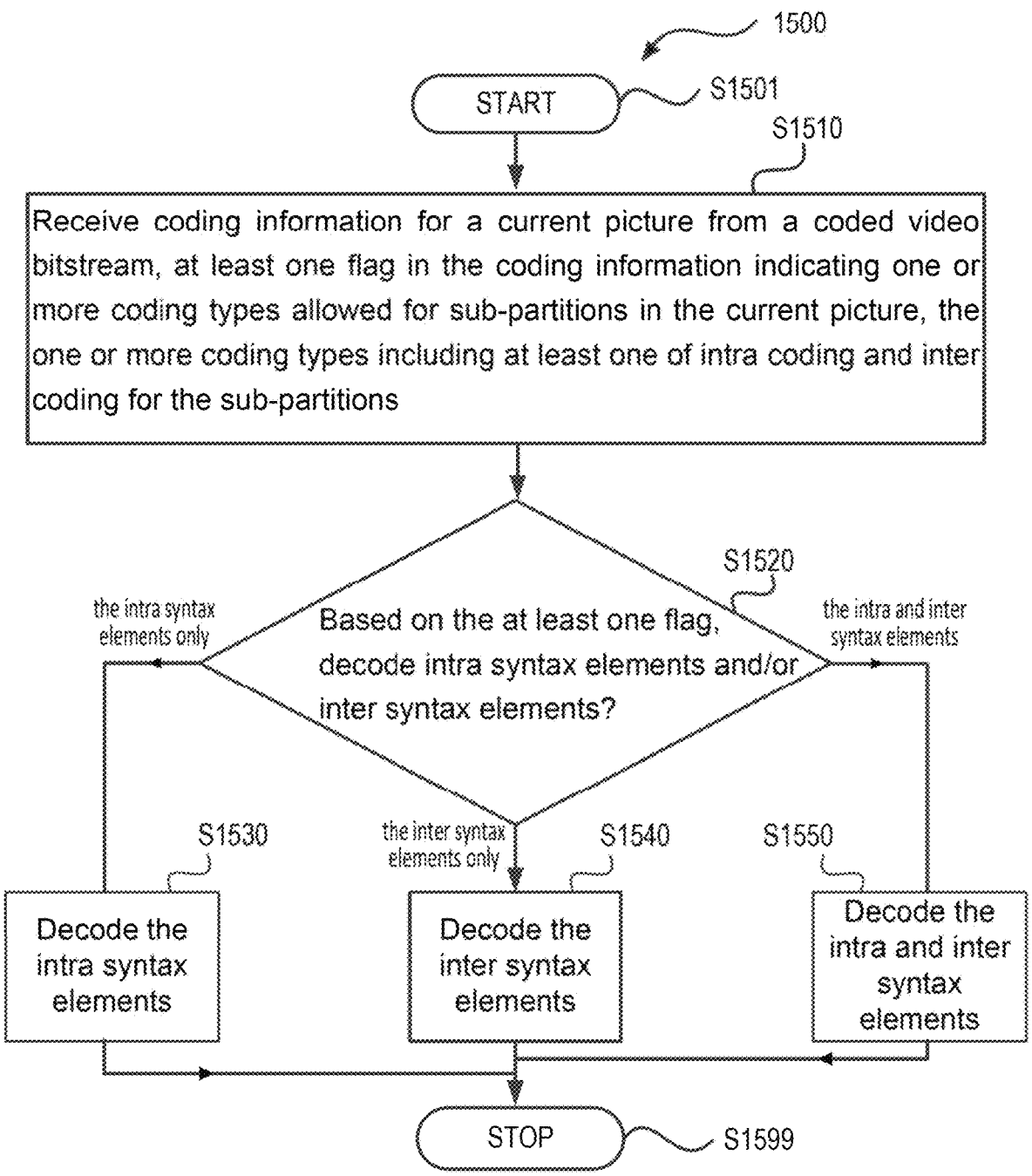
FIG. 15 shows a flow chart outlining a process (1500) according to an embodiment of the disclosure.

FIG. 15 shows a flow chart outlining a process (1500) according to an embodiment of the disclosure. The process (1500) can be used to reconstruct a block in a picture of a coded video sequence. The process (1500) can be used in the reconstruction of the block so to generate a prediction block for the block under reconstruction. The term block may be interpreted as a prediction block, a CB, a CU, or the like. In various embodiments, the process (1500) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1500) is implemented in software instructions, thus when the processing circuitry executes the software instructions, the processing circuitry performs the process (1500). The process starts at (S1501) and proceeds to (S1510).

At (S1510), coding information for a current picture can be received from a coded video bitstream. At least one flag in the coding information can indicate one or more allowable coding types allowed for sub-partitions in the current picture. The one or more allowable coding types can include at least one of intra coding and inter coding for the sub-partitions. The at least one flag can be a high level control flag signaled in a HLS, such as a PPS for the one or more pictures including the current picture, a picture header for the current picture, or the like. The sub-partitions can include at least one slice, at least one tile, or at least one tile group in the current picture.

The at least one flag can include a first flag and/or a second flag. The first flag can indicate whether an inter-coded sub-partition is allowed in the current picture and whether the sub-partitions include only intra-coded sub-partitions with the intra coding. The second flag can indicate whether an intra-coded sub-partition is allowed in the current picture and whether the sub-partitions include only inter-coded sub-partitions with the inter coding.

At (S1520), whether to decode intra syntax elements used only for coding intra sub-partitions and whether to decode inter syntax elements used only for coding inter sub-partitions can be determined based on the at least one flag. In various examples, since the one or more coding types include the intra coding and/or the inter coding, at least one of the intra syntax elements and the inter syntax elements is to be decoded, and thus, whether to decode the intra syntax elements and/or the inter syntax elements can be determined based on the at least one flag. When only the intra syntax elements are determined to be decoded, the process (1500) proceeds to (S1530). When only the inter syntax elements are determined to be decoded, the process (1500) proceeds to (S1540). When the intra syntax elements and the inter syntax elements are determined to be decoded, the process (1500) proceeds to (S1550).

At (S1530), the intra syntax elements in the coding information can be decoded. The process (1500) proceeds to (S1599), and terminates.

At (S1540), the inter syntax elements in the coding information can be decoded. The process (1500) proceeds to (S1599), and terminates.

At (S1550), both the intra syntax elements and the inter syntax elements in the coding information can be decoded. The process (1500) proceeds to (S1599), and terminates.

The process (1500) can be suitably adapted. Step(s) in the process (1500) can be modified and/or omitted. Additional step(s) can be added. Any suitable order of implementation can be used. For example, a coding block in one of the sub-partitions is reconstructed based on the intra syntax elements or the inter syntax elements associated with the one of the sub-partitions.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
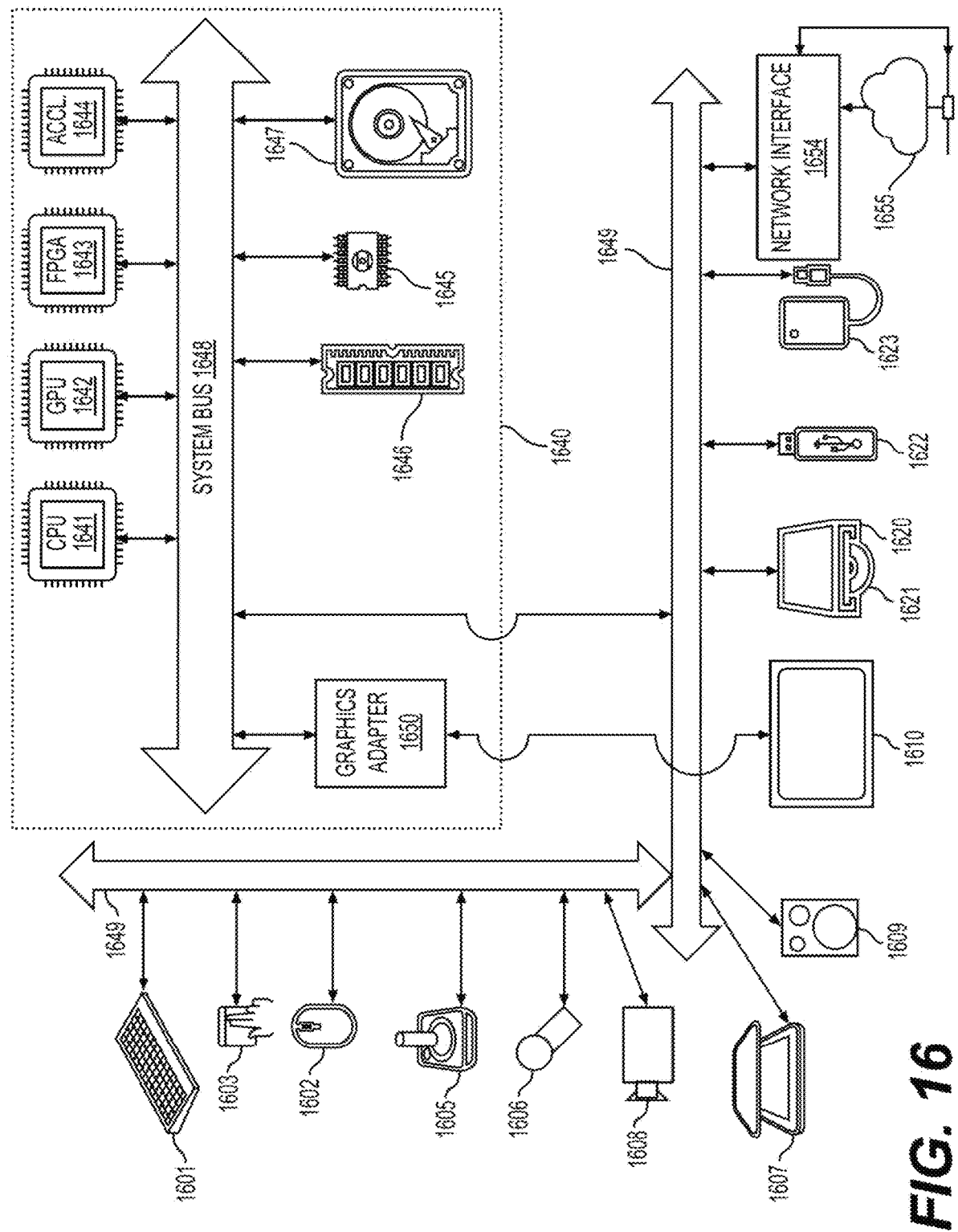
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapter (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, a display (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
MPM: most probable mode
WAIP: Wide-Angle Intra Prediction
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SDR: standard dynamic range
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component interconnect
FPGA: Field Programmable Gate Areas
SSD: solid-state drive
IC: Integrated Circuit
CU: Coding Unit
PDPC: Position Dependent Prediction Combination
ISP: Intra Sub-Partitions
SPS: Sequence Parameter Setting While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in an encoder, comprising:
    determining whether to generate inter syntax elements used only for coding inter-coded sub-partitions based on whether an inter-coded sub-partition is included in a picture;
    generating the inter syntax elements to be included in coding information based on a determination to generate the inter syntax elements;
    determining whether to generate intra syntax elements used only for coding intra-coded sub-partitions based on whether an intra-coded sub-partition is included in the picture;
    generating the intra syntax elements to be included in the coding information based on a determination to generate the intra syntax elements;
    setting a first flag in the coding information based on whether the inter syntax elements are generated, wherein the first flag being equal to 0 indicates that all coded slices of the picture have a slice type equal to 2, and the first flag being equal to 1 indicates that there might or might not be one or more coded slices in the picture that have a slice type of 0 or 1;
    in response to the first flag being equal to 1, setting a second flag in the coding information based on whether the intra syntax elements are generated, wherein the second flag being equal to 0 indicates that all the coded slices of the picture have the slice type of 0 or 1, and wherein the second flag being equal to 1 indicates that there might or might not be one or more coded slices in the picture that have the slice type equal to 2;
    and
    generating a coded bit stream including the coding information.

2. The method of claim 1, wherein the first flag indicates whether an inter-coded sub-partition is allowed in the picture and the second flag indicates whether an intra-coded sub-partition is allowed in the picture.

3. The method of claim 2, wherein
    the determining whether to generate the inter syntax elements includes determining that no inter syntax element is to be encoded for the picture;
    the determining whether to generate the intra syntax elements includes determining that the intra syntax elements are to be encoded; and
    the first flag is set to 1 and the second flag is not set.

4. The method of claim 2, wherein
    the determining whether to generate the inter syntax elements includes determining that the inter syntax elements are to be encoded;
    the determining whether to generate the intra syntax elements includes determining that no intra syntax element is to be encoded for the picture; and
    the first flag is set to 1, and the second flag is set to 0.

5. The method of claim 2, wherein
    the determining whether to generate the inter syntax elements includes determining that no inter syntax element is to be encoded for the picture;
    the determining whether to generate the intra syntax elements includes determining that the intra syntax elements are to be encoded; and
    the first flag is set to 0, and the second flag is set to 1.

6. The method of claim 2, wherein
    the determining whether to generate the inter syntax elements includes determining that the inter syntax elements are to be encode;
    the determining whether to generate the intra syntax elements includes determining that the intra syntax elements are to be encoded; and
    the first flag is set to 1, and the second flag is set to 1.

7. The method of claim 1, wherein the first flag is signaled in a picture parameter set (PPS) for one or more pictures including the picture or in a picture header for the picture.

8. The method of claim 1, wherein one of (i) the intra-coded sub-partitions and (ii) the inter-coded sub-partitions include at least one slice, at least one tile, or at least one tile group of the picture.

9. An apparatus for video encoding, comprising:
processing circuitry configured to
determine whether to generate inter syntax elements used only for coding inter-coded sub-partitions based on whether an inter-coded sub-partition is included in a picture;
generate the inter syntax elements to be included in coding information based on a determination to generate the inter syntax elements;
determine whether to generate intra syntax elements used only for coding intra-coded sub-partitions based on whether an intra-coded sub-partition is included in the picture;
generate the intra syntax elements to be included in the coding information based on a determination to generate the intra syntax elements;
set a first flag in the coding information based on whether the inter syntax elements are generated, wherein the first flag being equal to 0 indicates that all coded slices of a picture have a slice type equal to 2, and wherein the first flag being equal to 1 indicates that there might or might not be one or more coded slices in the picture that have a slice type of 0 or 1;
in response to the first flag being equal to 1, set a second flag in the coding information based on whether the intra syntax elements are generated, wherein the second flag being equal to 0 indicates that all the coded slices of the picture have the slice type of 0 or 1, and wherein the second flag being equal to 1 indicates that there might or might not be one or more coded slices in the picture that have the slice type equal to 2; and
generate a coded bit stream including the coding information.

10. The apparatus of claim 9, wherein the first flag indicates whether an inter-coded sub-partition is allowed in the picture and the second flag indicates whether an intra-coded sub-partition is allowed in the picture.

11. The apparatus of claim 10, wherein
the processing circuitry is further configured to:
determine that no inter syntax element is to be encoded for the picture; and
determine that the intra syntax elements are to be encoded; and
the first flag is set to 1 and the second flag is not set.

12. The apparatus of claim 10, wherein
the processing circuitry is further configured to:
determine that the inter syntax elements are to be encoded; and
determine that no intra syntax element is to be encoded for the picture; and
the first flag is set to 1, and the second flag is set to 0.

13. The apparatus of claim 10, wherein
the processing circuitry is further configured to:
determine that no inter syntax element is to be encoded for the picture; and
determine that the intra syntax elements are to be encoded; and
the first flag is set to 0, and the second flag is set to 1.

14. The apparatus of claim 10, wherein
the processing circuitry is further configured to:
determine that the inter syntax elements are to be encoded; and
determine that the intra syntax elements are to be encoded; and
the first flag is set to 1, and the second flag is set to 1.

15. The apparatus of claim 9, wherein the first flag is signaled in a picture parameter set (PPS) for one or more pictures including the picture or in a picture header for the picture.

16. The apparatus of claim 9, wherein one of (i) the intra-coded sub-partitions and (ii) the inter-coded sub-partitions include at least one slice, at least one tile, or at least one tile group of the picture.

17. A non-transitory computer-readable medium storing instructions which when executed by a computer for video encoding cause the computer to perform:
determining whether to generate inter syntax elements used only for coding inter-coded sub-partitions based on whether an inter-coded sub-partition is included in a picture;
generating the inter syntax elements to be included in coding information based on a determination to generate the inter syntax elements;
determining whether to generate intra syntax elements used only for coding intra-coded sub-partitions based on whether an intra-coded sub-partition is included in the picture;
generating the intra syntax elements to be included in the coding information based on a determination to generate the intra syntax elements;
setting a first flag in the coding information based on whether the inter syntax elements are generated, wherein the first flag being equal to 0 indicates that all coded slices of a picture have a slice type equal to 2, and the first flag being equal to 1 indicates that there might or might not be one or more coded slices in the picture that have a slice type of 0 or 1;
in response to the first flag being equal to 1, setting a second flag in the coding information based on whether the intra syntax elements are generated, wherein the second flag being equal to 0 indicates that all the coded slices of the picture have the slice type of 0 or 1, and wherein the second flag being equal to 1 indicates that there might or might not be one or more coded slices in the picture that have the slice type equal to 2;
generating a coded bit stream including the coding information.

18. The non-transitory computer-readable medium of claim 17, wherein the first flag indicates whether an inter-coded sub-partition is allowed in the picture and the second flag indicates whether an intra-coded sub-partition is allowed in the picture.

19. The non-transitory computer-readable medium of claim 18, wherein
the determining whether to generate the inter syntax elements includes determining that no inter syntax element is to be encoded for the picture;
the determining whether to generate the intra syntax elements includes determining that the intra syntax elements are to be encoded; and
the first flag is set to 1 and the second flag is not set.

20. The non-transitory computer-readable medium of claim 18, wherein
- the determining whether to generate the inter syntax elements includes determining that the inter syntax elements are to be encoded;
- the determining whether to generate the intra syntax elements includes determining that no intra syntax element is to be encoded for the picture; and
- the first flag is set to 1, and the second flag is set to 0.

* * * * *